United States Patent
Sakhnini et al.

(10) Patent No.: US 11,800,530 B2
(45) Date of Patent: Oct. 24, 2023

(54) FREQUENCY RESOURCE HOP EXTENSION, SKIPPING, AND MODIFICATION, AND RESCHEDULING UPLINK AND DOWNLINK TRANSMISSIONS THAT OVERLAP WITH TIME GAP FOR FREQUENCY RESOURCE SWITCHING

(71) Applicant: QUALCOMM Incorporated, San Diego, CA (US)

(72) Inventors: Iyab Issam Sakhnini, San Diego, CA (US); Yan Zhou, San Diego, CA (US); Tao Luo, San Diego, CA (US); Wooseok Nam, San Diego, CA (US); Qiang Wu, San Diego, CA (US); Jun Ma, San Diego, CA (US); Mehmet Izzet Gurelli, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 17/222,269

(22) Filed: Apr. 5, 2021

(65) Prior Publication Data
US 2022/0322407 A1 Oct. 6, 2022

(51) Int. Cl.
*H04W 72/12* (2023.01)
*H04W 72/23* (2023.01)
*H04L 5/00* (2006.01)
*H04W 72/50* (2023.01)
*H04W 72/0453* (2023.01)

(52) U.S. Cl.
CPC .......... *H04W 72/23* (2023.01); *H04L 5/0012* (2013.01); *H04W 72/535* (2023.01); *H04W 72/0453* (2013.01)

(58) Field of Classification Search
None
See application file for complete search history.

(56) References Cited

U.S. PATENT DOCUMENTS

| | | | |
|---|---|---|---|
| 2019/0394082 A1* | 12/2019 | Cirik | H04W 76/28 |
| 2020/0205195 A1* | 6/2020 | Sun | H04W 74/0808 |
| 2021/0298020 A1* | 9/2021 | Sakhnini | H04W 72/0453 |
| 2021/0345323 A1* | 11/2021 | Axmon | H04W 72/12 |
| 2022/0224393 A1* | 7/2022 | Gao | H04W 72/1242 |

FOREIGN PATENT DOCUMENTS

| | | | | |
|---|---|---|---|---|
| EP | 3930396 A1 * | 12/2021 | | H04L 1/1819 |
| WO | WO-2018063075 A1 * | 4/2018 | | H04L 27/2613 |
| WO | WO-2021046834 A1 * | 3/2021 | | |
| WO | WO-2021159531 A1 * | 8/2021 | | |
| WO | WO-2022017992 A1 * | 1/2022 | | |
| WO | WO-2022052094 A1 * | 3/2022 | | |
| WO | WO-2022211470 A1 * | 10/2022 | | |

* cited by examiner

*Primary Examiner* — Kodzovi Acolatse
(74) *Attorney, Agent, or Firm* — Patterson & Sheridan LLP

(57) ABSTRACT

Certain aspects of the subject matter described in this disclosure can be implemented in a method for wireless communication by a user equipment (UE). The method generally includes receiving, from a network entity, signaling that schedules an uplink or downlink transmission on resources that overlap with a time gap for switching from a first set of frequency resources to a second set of frequency resources; and taking an action to process the uplink or downlink transmission so that the uplink or downlink transmission does not overlap with the time gap.

10 Claims, 17 Drawing Sheets

FREQUENCY RESOURCE HOP EXTENSION, SKIPPING, AND MODIFICATION, AND RESCHEDULING UPLINK AND DOWNLINK TRANSMISSIONS THAT OVERLAP WITH TIME GAP FOR FREQUENCY RESOURCE SWITCHING

BACKGROUND

Field of the Disclosure

Aspects of the present disclosure relate to wireless communications, and more particularly, to techniques for rescheduling uplink and downlink transmissions scheduled on resources that overlap with a time gap for switching frequency resources. Aspects of the present disclosure further relate to techniques and apparatuses for frequency hopping and frequency resource hop extension, skipping, and modification.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved performance efficiency while operating in a narrow bandwidth.

Certain aspects of the subject matter described in this disclosure may be implemented in a method for wireless communication by a user equipment (UE). The method generally includes receiving, from a network entity, signaling that schedules an uplink or downlink transmission on resources that overlap with a time gap for switching from a first set of frequency resources to a second set of frequency resources; and taking an action to process the uplink or downlink transmission so that the uplink or downlink transmission does not overlap with the time gap.

Certain aspects of the subject matter described in this disclosure may be implemented in a method for wireless communication by a network entity. The method generally includes determining that an uplink or downlink transmission is scheduled for a user-equipment (UE) on resources that overlap with a time gap for switching from a first set of frequency resources to a second set of frequency resources; and in response to the determining, taking an action to reschedule the uplink or downlink transmission so that the uplink or downlink transmission does not overlap with the time gap.

In some aspects, a method of wireless communication, performed by a wireless communication device, may include determining that a frequency resource hop is to be extended in association with communicating a transmission that would occur during a switching gap between the frequency resource hop and a subsequent frequency resource hop; extending the frequency resource hop by an amount of time based at least in part on determining that the frequency resource hop is to be extended; and communicating the transmission in the frequency resource hop based at least in part on extending the frequency resource hop.

Certain aspects of the subject matter described in this disclosure can be implemented in a method for wireless communication by a base station. The method generally includes configuring a user-equipment (UE) with a frequency hopping configuration for communication on a channel, determining whether the frequency hopping configuration is to be adjusted based on a condition associated with the communication, adjusting the frequency hopping configuration based on the determination, wherein the adjustment to the frequency hopping configuration comprises skipping or modifying a configuration of one or more frequency hops of the frequency hopping configuration; and communicating with the UE using the adjusted frequency hopping configuration.

Certain aspects of the subject matter described in this disclosure can be implemented in a method for wireless communication by a user equipment (UE). The method generally includes receiving an indication of a frequency hopping configuration for communication on a channel, and applying the frequency hopping configuration for the communication. The method may also include determining whether the frequency hopping configuration is to be adjusted based on a condition associated with the communication; adjusting the frequency hopping configuration based on the determination, where the adjustment to the frequency hopping configuration comprises skipping or modifying a configuration of one or more frequency hops of the frequency hopping configuration, and communicating using the adjusted frequency hopping configuration.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
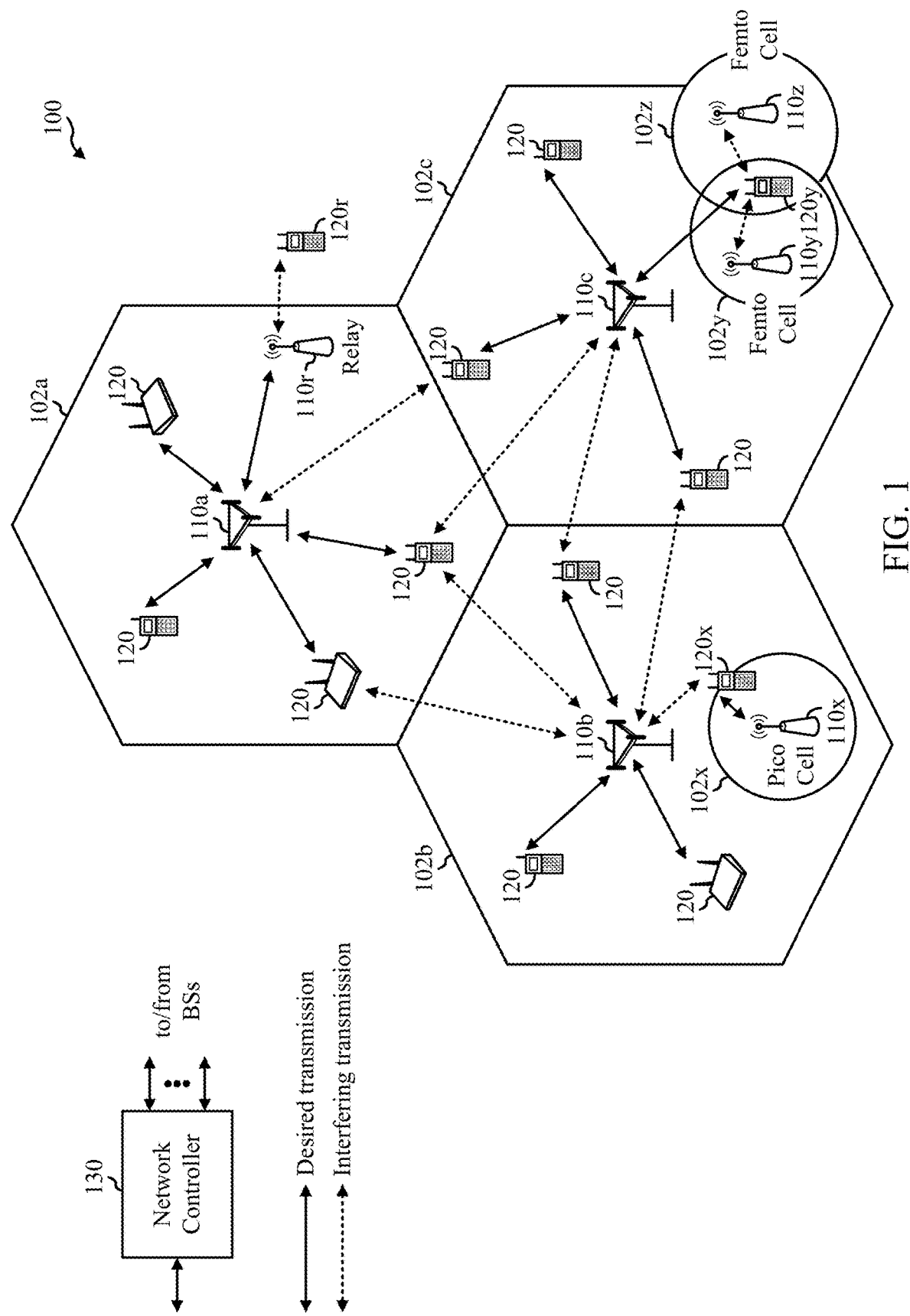
FIG. 1 is a block diagram conceptually illustrating an example telecommunications system, in accordance with certain aspects of the present disclosure.

Aspects of the present disclosure provide apparatus, methods, processing systems, and computer readable mediums for rescheduling uplink and downlink transmissions scheduled on resources that overlap with a time gap for switching frequency resources. For example, a user equipment (UE) may indicate a time gap required to switch frequency resources. A frequency resource may, for instance, be a bandwidth part (BWP) or a subband. The time gap allows time for RF front-end circuitry of the UE to be reconfigured for a new frequency location. In some cases, uplink or downlink transmissions may be scheduled on frequency resources that overlap with the time gap. As such, embodiments of the present disclosure involve different techniques for rescheduling these uplink or downlink transmissions so that they do not overlap with the time gap.

Furthermore, certain aspects relate to extending a frequency resource hop (e.g., a BWP hop, a sub-band hop, or the like). In some aspects, a wireless communication device may determine that a frequency resource hop is to be extended in association with communicating a transmission that would occur during a switching gap between the frequency resource hop and a subsequent frequency resource hop, may extend the frequency resource hop by an amount of time, and may communicate the transmission in the extended frequency resource hop.

In certain aspects, one or more frequency hops of a preconfigured frequency hopping pattern may be skipped or modified depending on one or more conditions. For example, if a frequency hop does not have a control resource set scheduled therein, the frequency hop may be skipped. As another example, if channel quality associated with a frequency hop is less than a threshold, the frequency hop may be skipped or modified, for example, from one frequency location to another.

The following description provides examples of rescheduling uplink and downlink transmissions scheduled on resources that overlap with a time gap for switching frequency resources in communication systems as well as frequency resource hop extension, skipping, and modification, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network), in which aspects of the present disclosure may be performed. For example, the wireless network 100 may include a UE 120 configured to perform operations 500 of FIG. 5 for rescheduling uplink and downlink transmissions scheduled on resources that overlap with a time gap for switching frequency resources, operations 800 of FIG. 8 related to a frequency resource hop extension, and/or operations 1000 of FIG. 10 related to adjusting a frequency hop configuration. Similarly, a base station 110 (e.g., a gNB) may be configured to perform operations 400 of FIG. 4 for rescheduling uplink and downlink transmissions scheduled on resources that overlap with a time gap for switching frequency resources, operations 800 of FIG. 8 related to a frequency resource hop extension, and/or operations 900 of FIG. 9 related to adjusting a frequency hop configuration.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
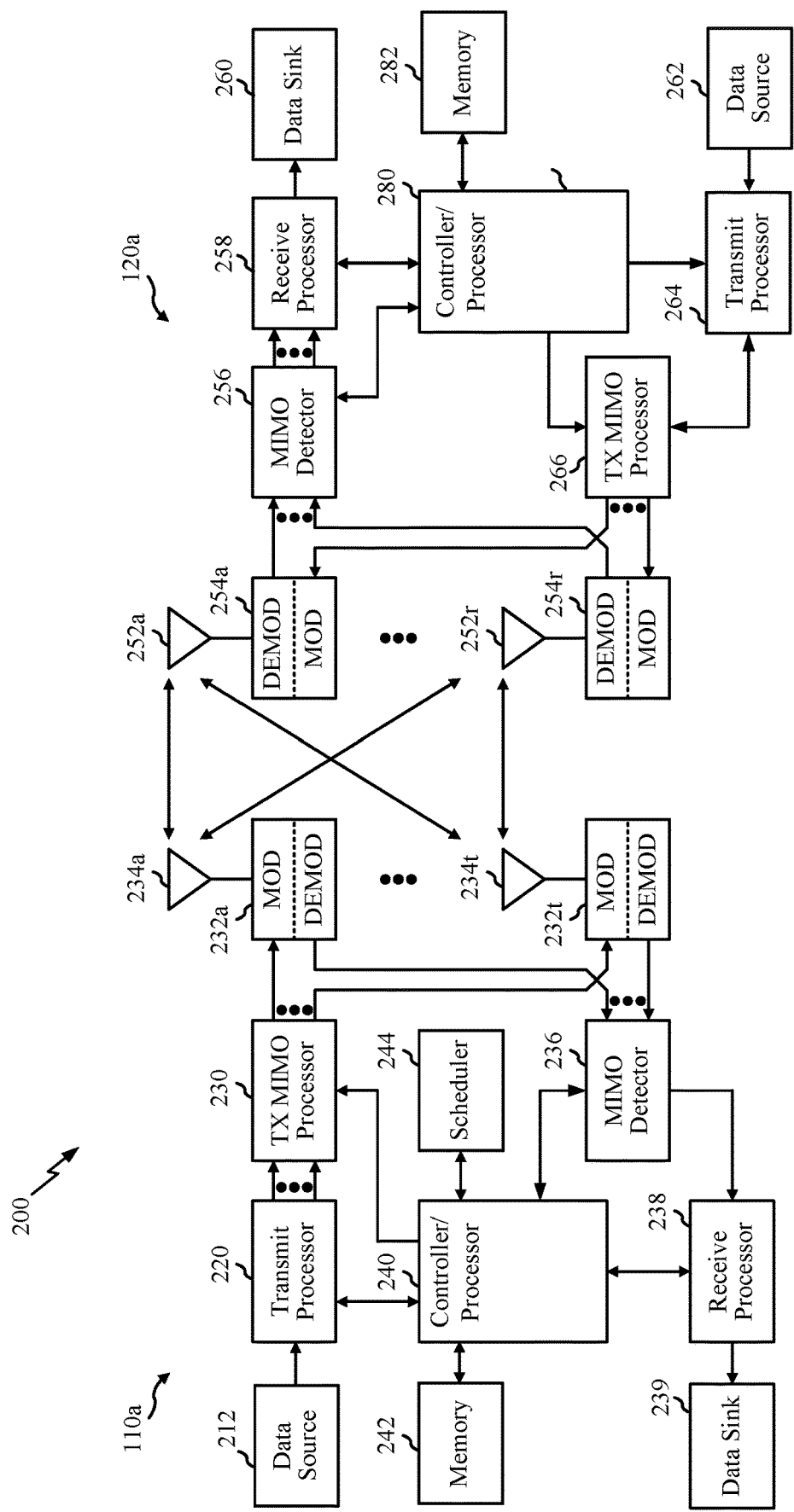
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, the controller/processor 240 of the BS 110a may perform operations 400 of FIG. 4, operations 800 of FIG. 8, and/or operations 900 of FIG. 9. The controller/processor 280 of the UE 120a may be configured to perform operations 500 of FIG. 5, operations 800 of FIG. 8, and/or operations 1000 of FIG. 10. Other components of the UE 120a and BS 110a may also be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
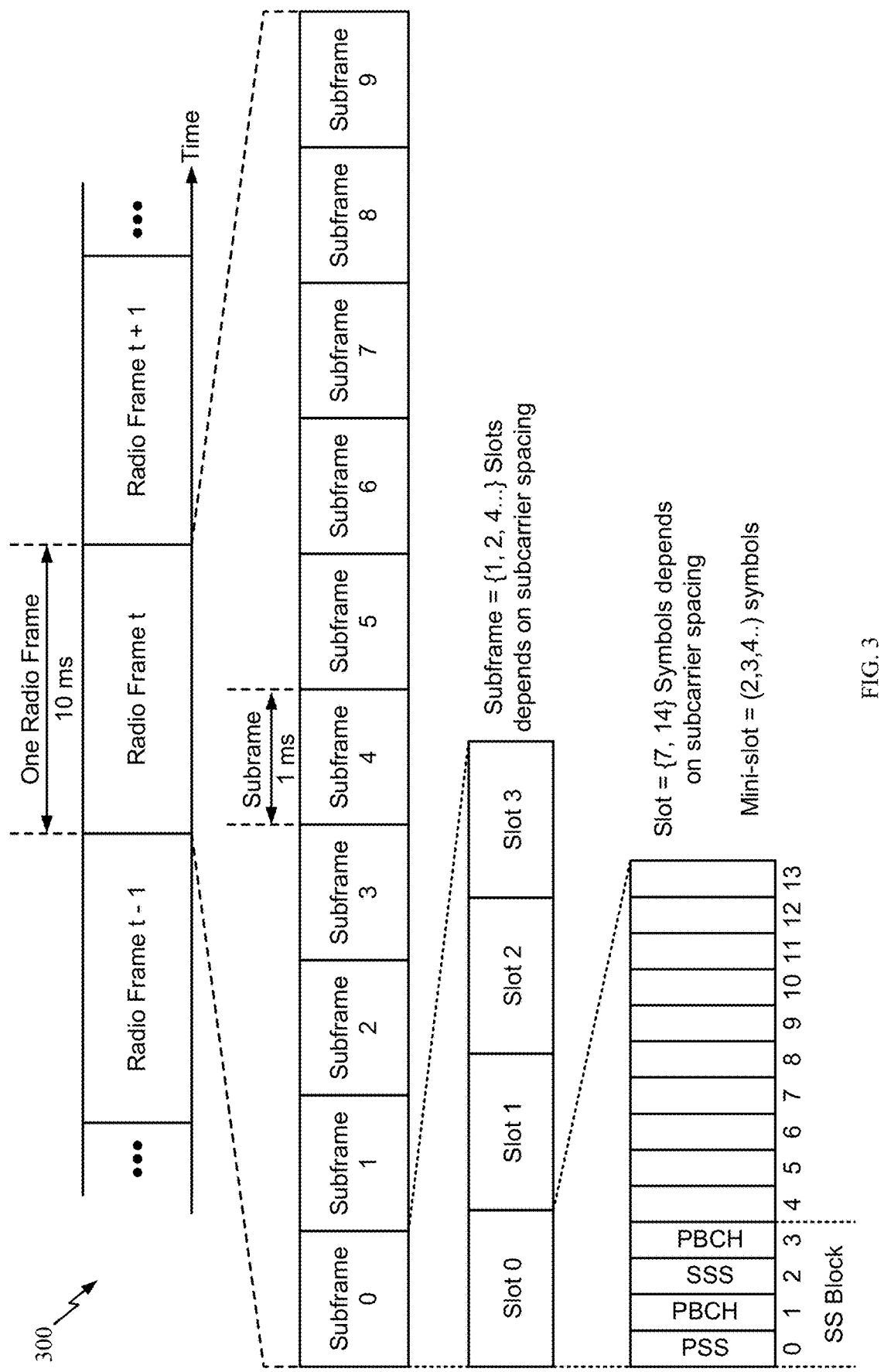
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Certain aspects of the present disclosure generally relate to frequency hopping in a bandwidth part (BWP) of a carrier bandwidth. Frequency hopping may be motivated by seeking to improve frequency diversity within a narrow band of operation and to mitigate (or at least reduce) frequency selective interference. For example, intra BWP frequency hopping may be implemented for a physical uplink control channel (PUCCH) and a physical uplink shared channel, in certain implementations. In some cases, BWP switching for downlink (DL) signaling may be implemented. For example, cross-BWP scheduling may be employed by using control signaling in one BWP to schedule resources in another BWP. To facilitate reduced bandwidth (BW) operation, a narrow BWP (NBWP) may be deployed in certain configurations. For example, after connection establishment (e.g., of an initial BWP), a UE may switch to a NBWP among multiple NBWPs to reduce radio frequency (RF) power consumption.

To mitigate potential performance loss due to reduced bandwidth operation, frequency hopping may be implemented. In some cases, intra-BWP/intra-slot frequency hopping may be deployed. In this case, since the frequency hopping may be within a BWP, the BW of the BWP may configured to be large enough for higher diversity. Moreover, since the frequency hopping takes place back to back within a slot or across slots, the UE may have to either maintain the RF bandwidth open for the entire BWP, resulting in increased power consumption, or the UE should have the capability to rapidly switch from one RF band to another RF band within the BWP, which may be difficult to achieve.

In some cases, BWP switching among multiple NBWPs may be implemented. The BWP configuration, such as the number of configurable BWPs and dynamic BWP switching, may be specific to each UE and its capability. Moreover, since only up to four BWPs may be supported in some deployments (e.g., in new radio (NR) Release 15), the diversity gain associated with BWP switching may be limited. In some cases, a downlink (DL)/uplink (UL) data transmission may be confined within a BWP. In other words, duplicated or redundant transmissions over multiple BWPs, which is important to achieve the frequency diversity gain, may not be supported.

Time Gap for Switching Frequency Resources

Certain aspects of the present disclosure are generally related to switching from a first set of frequency resources to a second set of frequency resources. For example, a UE may switch from a first BWP to a second BWP or from a first subband (SB) within a BWP to a second SB within the BWP.

In certain aspects, the UE may indicate a time gap needed to transition between frequency resources, such as via signaling to a BS. The time gap may be configured to allow time for RF front-end circuitry of the UE to be reconfigured for the new frequency location of the BWP or SB. However, in some cases, uplink and/or downlink transmissions may be scheduled on resources that overlap with the time gap. For example, acknowledgement feedback (e.g., Ack/Nack) may potentially be dropped if scheduled during the time gap.

Figure 4:
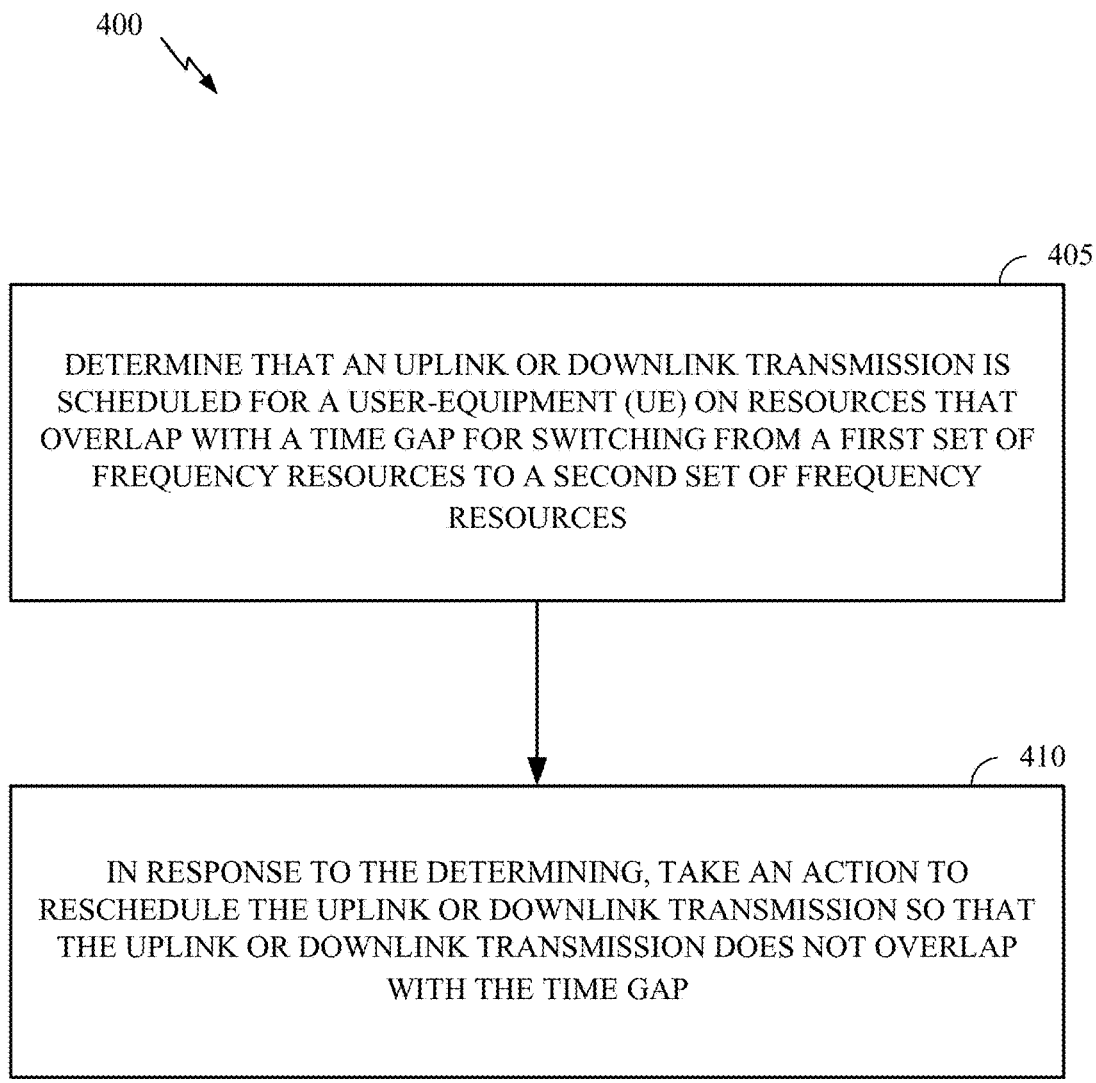
FIG. 4 is a flow diagram illustrating example operations for wireless communication by a network entity, in accordance with certain aspects of the present disclosure.

Example Techniques for Rescheduling Uplink and Downlink Transmissions Scheduled on Resources that Overlap with a Time Gap for Switching Frequency Resources FIG. 4 is a flow diagram illustrating example operations 400 for wireless communication, in accordance with certain aspects of the present disclosure. The operations 400 may be performed, for example, by a network entity such as a BS (e.g., BS 110a in the wireless communication network 100).

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at block 405, with the network entity determining that an uplink or downlink transmission is scheduled for a user-equipment (UE) on resources that overlap with a time gap for switching from a first set of frequency resources to a second set of frequency resources.

The operations 400 may continue, at block 410, with the network entity, in response to the determining, taking an action to reschedule the uplink or downlink transmission so that the uplink or downlink transmission does not overlap with the time gap.

Figure 5:
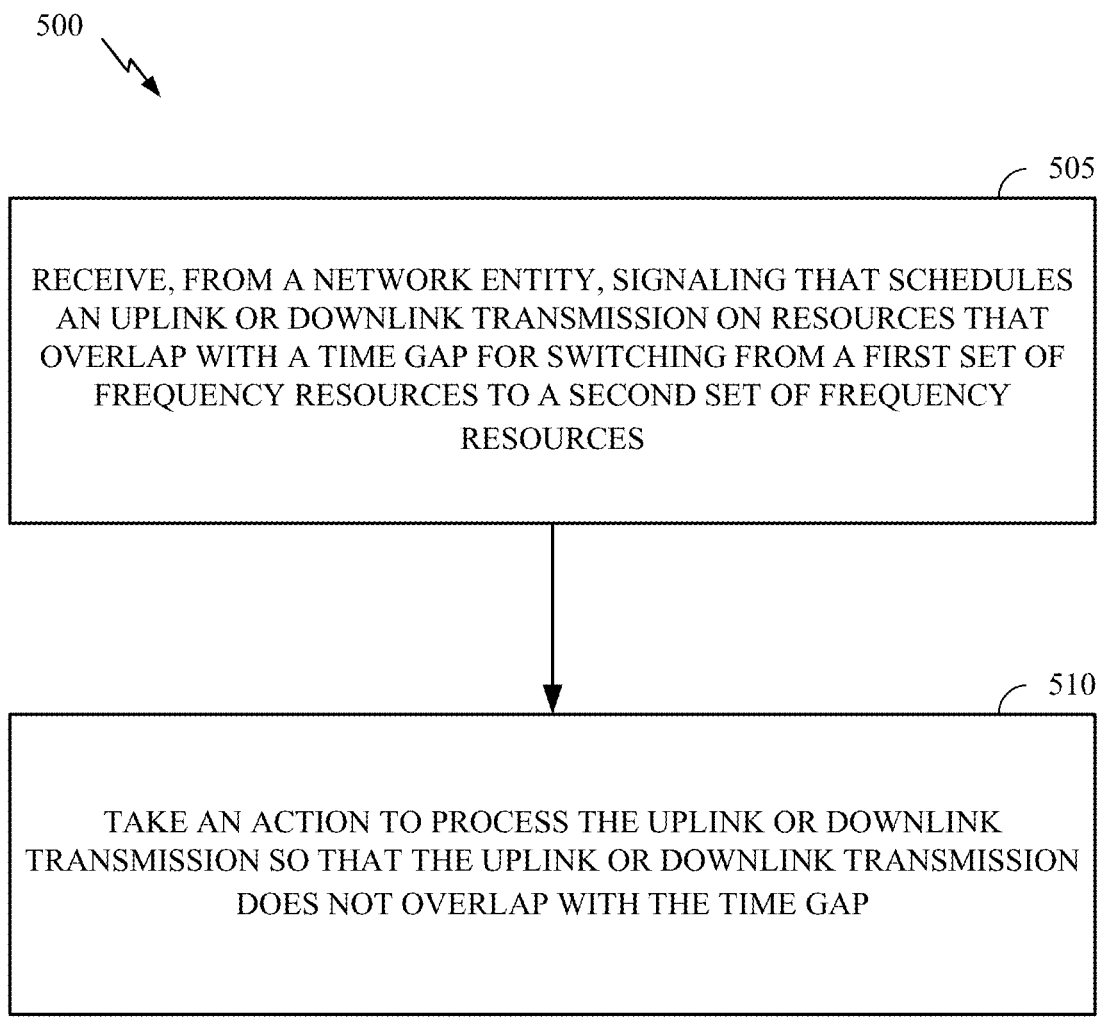
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by UE (e.g., such as a UE 120a in the wireless communication network 100). The operations 500 may be complimentary operations by the UE to the operations 400 performed by the network entity.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the UE receiving, from a network entity, signaling that schedules an uplink or downlink transmission on resources that overlap with a time gap for switching from a first set of frequency resources to a second set of frequency resources.

The operations 500 may continue, at block 510, with the UE taking an action to process the uplink or downlink transmission so that the uplink or downlink transmission does not overlap with the time gap.

Techniques described herein involve rescheduling uplink or downlink transmissions that are scheduled on resources that overlap with a time gap for switching frequency resources. According to one embodiment, an uplink or downlink transmission that is originally scheduled during a time gap for switching between a first set of frequency resources and a second set of frequency resources is rescheduled on the second set of frequency resources via explicit signaling to the UE from a BS or according to an implicit rule.

In one example, an uplink transmission for acknowledgement of PDSCH signaling scheduled by DCI overlaps with the time gap. In this case, the scheduling DCI may indicate a given frequency resource of the second set of frequency resources to use for the uplink transmission. Alternatively, the uplink transmission may be sent on the next available uplink resource of the second set of frequency resources that is configured for acknowledgment signaling (e.g., HARQ). Alternatively, the BS may configure in advance a default frequency resource of the second set of frequency resources to use for rescheduling acknowledgment signaling.

In another example, an uplink transmission for acknowledgement of PDSCH signaling scheduled by semi-persistent scheduling (SPS) or a configured grant (CG) overlaps with the time gap. In this case, the uplink transmission may be sent on the next available uplink resource of the second set of frequency resources that is configured for acknowledgment signaling. Alternatively, the BS may configure in advance a default frequency resource of the second set of frequency resources to use for rescheduling acknowledgment signaling.

In some embodiments, to avoid acknowledgment signaling being dropped during a time gap for switching frequency resources, the counter or timer is frozen during the time gap and DCI signaling indicates a PUCCH resource or PUSCH resource in the second set of frequency resources to use for the acknowledgment signaling. Alternatively, DCI signaling may indicate a PUCCH or PUSCH resource in the second set of frequency resources to use for the acknowledgment signaling and an acknowledgement delay (e.g., K1 range) is increased (e.g., to at least 18 slots for a type 2 UE instead of 15 slots).

In certain embodiments, a SPS/CG uplink or downlink transmission may overlap with the time gap. To avoid dropping the uplink or downlink transmission, all timers and/or counters may be frozen during the time gap, and the uplink or downlink transmission may be continued on the second set of frequency resources. In some cases, the BS indicates resources in the second set of frequency resources to use for the uplink or downlink transmission, such as via DCI or radio resource control (RRC) signaling to the UE. In other embodiments, the uplink or downlink transmission may be sent on the next available resource in the second set of frequency resources that is available for dynamic grant scheduling.

In some embodiments, for dynamic PUSCH/PDSCH grants, the procedures for a BWP switching gap are also used for a SB switching gap.

Frequency Hop Extension

Frequency resource hopping allows a wireless communication device (e.g., a UE 120, a base station 110) to hop among different frequency resources (e.g., bandwidth parts (BWPs), sub-bands, or the like) in association with transmitting or receiving wireless communications. For example, a wireless communication device may operate in a first BWP for a first period of time, and may transmit and/or receive one or more communications in the first BWP during the first period of time. Here, after the first period of time, the wireless communication device may switch to a second BWP (e.g., a predetermined BWP, a randomly selected BWP, or the like) and may transmit and/or receive one or more communications in the second BWP during a second period of time. After the second period of time, the wireless communication device may switch to another BWP (e.g., the first BWP, another predetermined BWP, another randomly selected BWP), and may transmit and/or receive one or more communications in the other BWP during a third period of time. Subsequent hops can be performed in a similar manner.

Frequency resource hopping may be beneficial to, for example, reduce interference effects (e.g., narrowband interference effects). However, switching gaps that occur while the wireless communication device hops from one frequency resource to another frequency resource can be undesirably long (e.g., up to 3 milliseconds (ms)) which leads to reduced resource utilization and/or scheduling delays. For example, in a scenario in which a physical downlink shared channel (PDSCH) communication is scheduled just before a switch from one frequency resource to another frequency resource, a hybrid automatic repeat request acknowledgment (HARQ-ACK) can fall within a switching gap. While it may be possible to reschedule the HARQ-ACK into a subsequent frequency resource hop in some cases, such rescheduling can significantly increase latency associated with the HARQ-ACK. A similar scenario exists in the case of a semi-persistent scheduling (SPS) communication or a configured grant (CG) communication that falls within a sub-band (SB) switching gap.

Some aspects described herein provide techniques and apparatuses for extending a frequency resource hop (e.g., a BWP hop, a sub-band hop, or the like). In some aspects, a wireless communication device may determine that a frequency resource hop is to be extended in association with communicating a transmission that would occur during a switching gap between the frequency resource hop and a subsequent frequency resource hop, may extend the frequency resource hop by an amount of time, and may communicate the transmission in the extended frequency resource hop. In some aspects, the techniques and apparatuses for extending a frequency resource hop, described herein, may improve resource utilization and/or scheduling delays that would typically be caused by frequency resource hopping. Additional details are provided below.

Figure 6:
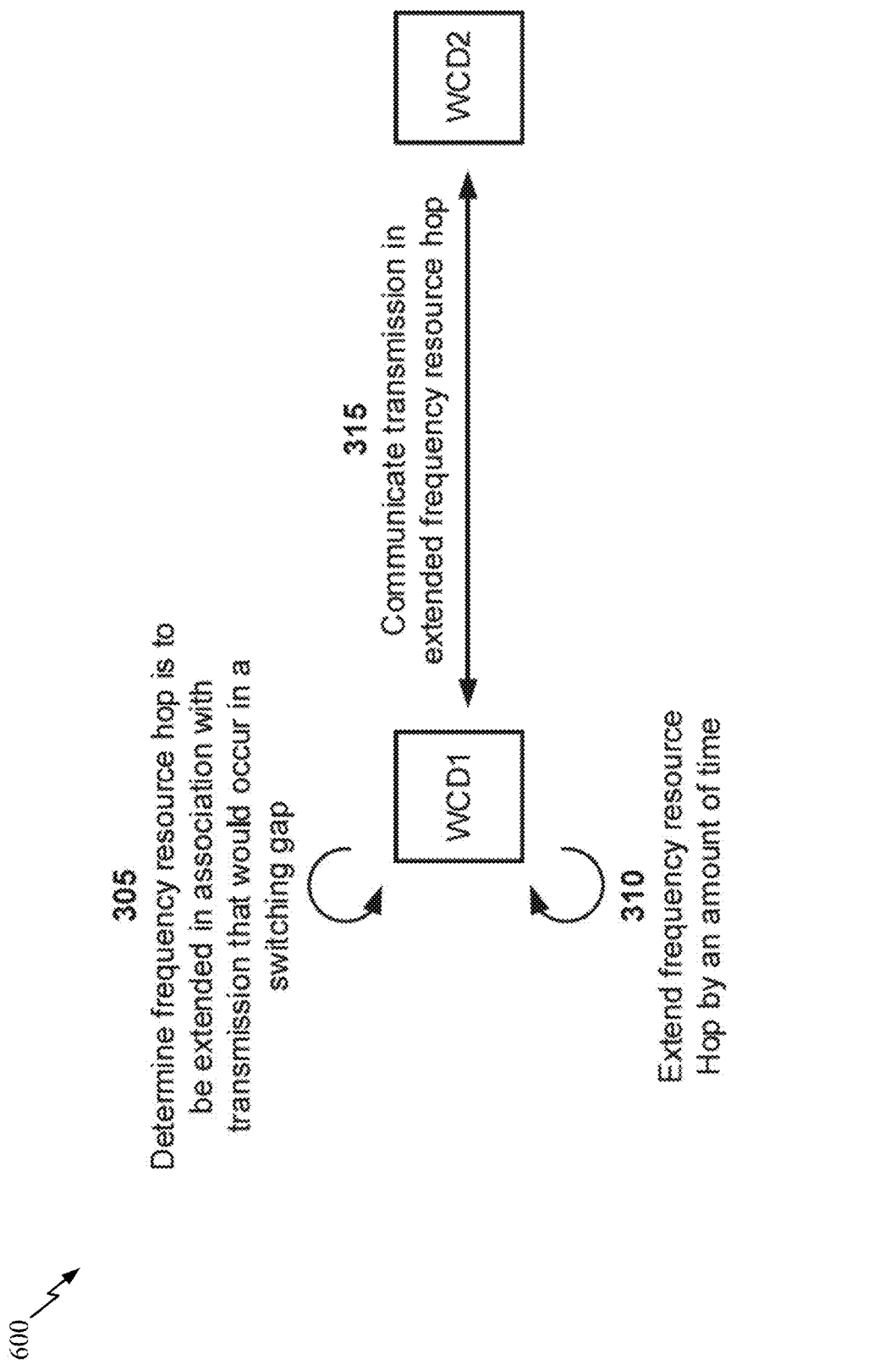
FIGS. 6 and 7 are diagrams illustrating examples associated with a frequency resource hop extension, in accordance with various aspects of the present disclosure.
Figure 7:
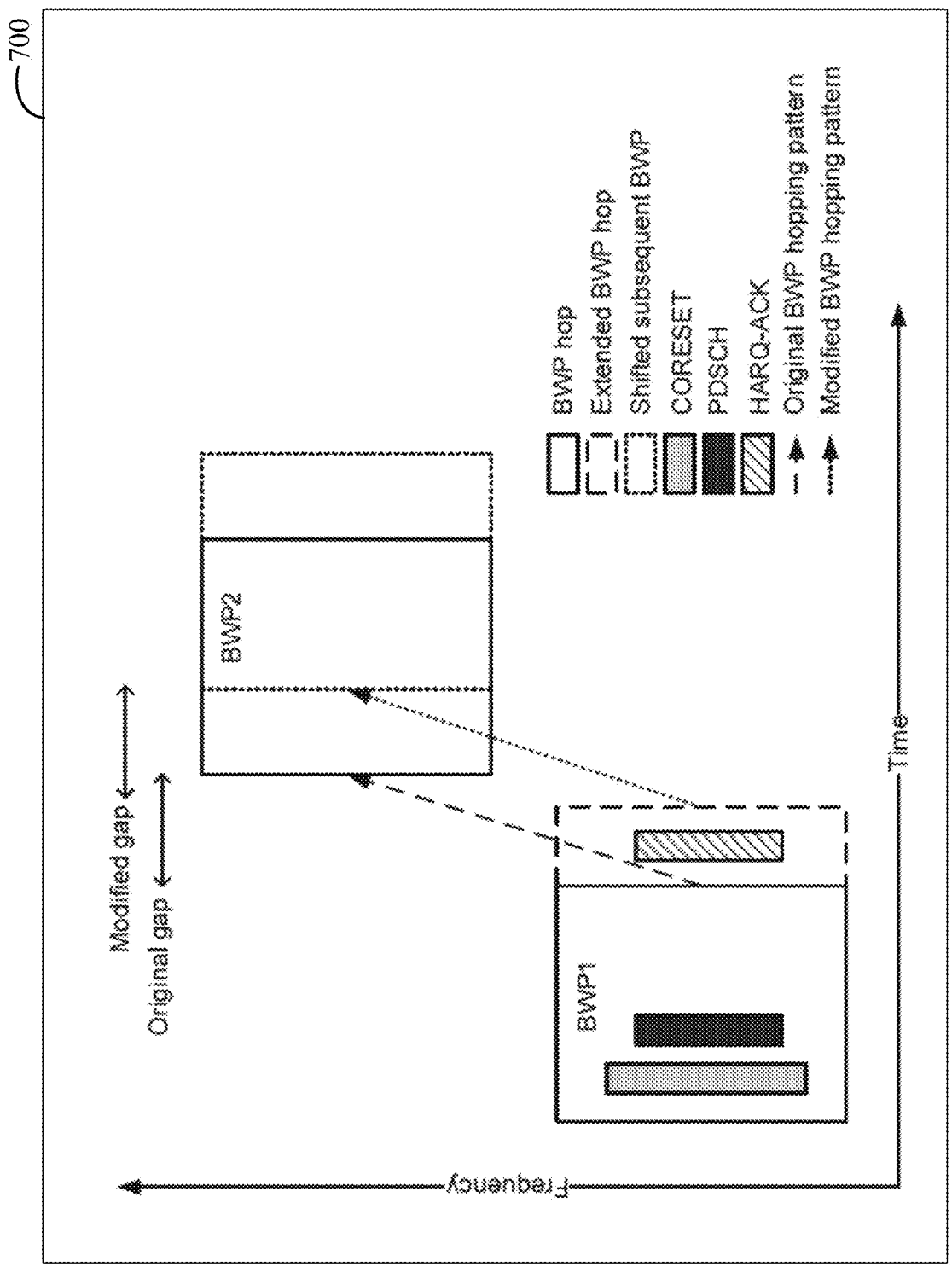

FIGS. 6 and 7 are diagrams illustrating examples associated with a frequency resource hop extension, in accordance with various aspects of the present disclosure.

As shown in FIG. 6 by reference 305 a wireless communication device (identified as WCD1, which may be, for example, a UE 120 or a base station 110) may determine that a frequency resource hop is to be extended in association with communicating a transmission that would occur during a switching gap between the frequency resource hop and a subsequent frequency resource hop. In some aspects, a frequency resource hop is, for example, a BWP hop, a sub-band hop, or a hop associated with another type of frequency resource. In some aspects, the transmission is a downlink transmission to be received by the wireless communication device or an uplink transmission that is to be transmitted by the wireless communication device (e.g., when the wireless communication device is a UE 120). In some aspects, the transmission is a downlink transmission to be transmitted by the wireless communication device or an uplink transmission that is to be received by the wireless communication device (e.g., when the wireless communication device is a base station 110).

In some aspects, the wireless communication device determines that the frequency resource hop is to be extended based at least in part on an explicit indication. For example, the wireless communication device may receive, from another wireless communication device (e.g., WCD2, which can be a base station 110, a UE 120, or the like) an explicit indication that the frequency resource hop is to be extended. In some aspects, the explicit indication can be signaled via, for example, radio resource control (RRC) signaling, a medium access control control element (MAC-CE), downlink control information (DCI), or the like. As a particular example, the wireless communication device may be a UE, the other wireless communication device may be a base station, and the transmission may be a HARQ-ACK transmission. In this example, the base station may provide DCI that both schedules a PDSCH transmission and includes an explicit indication to extend the frequency resource hop to accommodate the HARQ-ACK transmission associated with the PDSCH transmission.

In some aspects, the wireless communication device determines that the frequency resource hop is to be extended based at least in part on an implicit indication associated with one or more extension rules for determining whether to extend frequency resource hops. Thus, in some aspects, the wireless communication device determines that the frequency resource hop is to be extended based at least in part on one or more extension rules. As an example, an extension rule may indicate that if a transmission falls within a switching gap, then the wireless communication device is to extend the frequency resource hop to accommodate the transmission. As another example, an extension rule may indicate that if a transmission is to take place within a particular number of slots from an end of the frequency resource hop, then the wireless communication device is to extend the frequency resource hop. As another example, as described in further detail below, an extension rule may indicate that if a transmission type of the transmission is included in a set of transmission types for which frequency resource hops are to be extended, then the wireless communication device is to extend the frequency resource hop. In some aspects, the determination to extend the frequency resource hop may be made based on a single extension rule or based on multiple extension rules.

In some aspects, the one or more extension rules can be signaled to the wireless communication device via, for example, RRC signaling, a MAC-CE, DCI, or the like. Additionally, or alternatively, the one or more extension rules can be configured on the wireless communication device in accordance with a specification (e.g., a relevant wireless communications standards specification). In some aspects, a given extension rule of the one or more extension rules can be enabled or disabled on the wireless communication device (e.g., via RRC signaling, a MAC-CE, DCI, or the like).

In some aspects, the wireless communication device determines that the frequency resource hop is to be extended based at least in part on a determination that a transmission type of the transmission is included in a set of transmission types for which frequency resource hops are to be extended. For example, the wireless communication device may determine information indicating a set of transmission types for which frequency resource hops are to be extended. Here, the wireless communication device may determine that the transmission would occur within the switching gap between the frequency resource hop and the subsequent frequency resource hop, and may determine whether a transmission type of the transmission is included in the set of transmission types. In this example, if the transmission type of the transmission is included in the set of transmission types, then the wireless communication device may determine that the frequency resource hop is to be extended. Conversely, if the transmission type of the transmission is not included in the set of transmission types, then the wireless communication device may determine that the frequency resource hop is not to be extended.

In some aspects, the information indicating the set of transmission types is signaled to the wireless communication device via, for example, RRC signaling, a MAC-CE, DCI, or the like. Additionally, or alternatively, the information indicating the set of transmission types is configured on the wireless communication device in accordance with a specification (e.g., a relevant wireless communications standards specification).

In some aspects, the set of transmission types for which frequency resource hops are to be extended can include, for example, an SPS transmission, a CG transmission, a control resource set (CORESET) transmission, a dynamic PDSCH transmission, a dynamic physical uplink shared channel (PUSCH) transmission, a HARQ-ACK transmission, a channel state information (CSI) transmission, a sounding reference signal (SRS) transmission, a CSI reference signal (CSI-RS) transmission, a physical random access channel (PRACH) transmission, or the like.

As shown by reference 310 the wireless communication device may extend the frequency resource hop by an amount of time based at least in part on determining that the frequency resource hop is to be extended.

In some aspects, information indicating the amount of time by which the wireless communication device is to extend the frequency resource hop can be signaled to the wireless communication device. For example, the wireless communication device may receive, from another wireless communication device (e.g., WCD2, which can be a base station 110, a UE 120, or the like) an explicit indication that the frequency resource hop is to be extended by a particular amount of time (e.g., by a particular number of slots, to a particular slot number, or the like). In some aspects, the information indicating the amount of time can be signaled via, for example, RRC signaling, a MAC-CE, DCI, or the like.

Alternatively, in some aspects, information indicating the amount of time that the wireless communication device is to extend the frequency resource hop can be determined based at least in part on one or more timing rules associated with determining amounts of time to extend frequency resource hops. As an example, a timing rule may indicate that the wireless communication device is to extend the frequency resource hop until the slot after the transmission. In some aspects, the one or more timing rules can be signaled to the wireless communication device via, for example, RRC signaling, a MAC-CE, DCI, or the like. Additionally, or alternatively, the one or more timing rules can be configured on the wireless communication device in accordance with a specification (e.g., a relevant wireless communications standards specification).

As shown by reference 315, the wireless communication device may communicate (e.g., transmit or receive) the transmission in the frequency resource hop based at least in part on extending the frequency resource hop. In other words, the wireless communication device may communicate the transmission in the frequency resource hop that is extended by the particular amount of time.

In some aspects, the wireless communication device can modify the subsequent frequency resource hop based at least in part on the amount of time that the wireless communication device extended the frequency resource hop. For example, the wireless communication device may modify the subsequent frequency resource hop by shifting the subsequent frequency resource hop by the amount of time that the frequency resource hop is extended. Here, the wireless communication device may also shift one or more frequency resource hops after the subsequent frequency resource hop by the amount of time that the frequency resource hop is extended. In some aspects, the wireless communication device may shift all scheduled subsequent frequency resource hops by the amount of time that the frequency resource hop is extended.

As another example, the wireless communication device may modify the subsequent frequency resource hop by truncating a length of the subsequent frequency resource hop by the amount of time that the frequency resource hop is extended. Here, the wireless communication device may not modify other scheduled frequency resource hops (e.g., the wireless communication device may not modify scheduling of other frequency resource hops).

In some aspects, a manner in which the subsequent frequency resource hop is to be modified can be signaled to the wireless communication device via, for example, RRC signaling, a MAC-CE, DCI, or the like. Additionally, or alternatively, a manner in which the subsequent frequency resource hop is to be modified can be configured on the wireless communication device in accordance with a specification (e.g., a relevant wireless communications standards specification).

In some aspects, the wireless communication device may skip the subsequent frequency resource hop. For example, the wireless communication device may determine that the frequency resource hop, when extended by the amount of time, overlaps the subsequent frequency resource hop in time by an amount that satisfies a threshold. Here, based at least in part on the determination, the wireless communication device may skip the subsequent frequency resource hop. In some aspects, the wireless communication device may further extend the frequency resource hop to cover the skipped subsequent frequency resource hop. In some aspects, information indicating the threshold can be signaled to the wireless communication device via, for example, RRC signaling, a MAC-CE, DCI, or the like. Additionally, or alternatively, information indicating the threshold can be configured on the wireless communication device in accordance with a specification (e.g., a relevant wireless communications standards specification).

In some aspects, the wireless communication device may receive an indication to enable or disable the skipping of the subsequent frequency resource hop and/or the further extending of the frequency resource hop. In some aspects, the indication to enable or disable the skipping of the subsequent frequency resource hop and/or the further extending of the frequency resource hop can be signaled to the wireless communication device via, for example, RRC signaling, a MAC-CE, DCI, or the like.

FIG. 7 is a depiction 700 of an illustrative example associated with extending a frequency resource hop as described in association with FIG. 6. In the example shown in FIG. 7, the wireless communication device is a UE (e.g., a UE 120) and the transmission is a HARQ-ACK transmission associated with a PDSCH transmission. In FIG. 7, the UE determines that the HARQ-ACK transmission that would occur during a switching gap between a first BWP hop (BWP1) and a second BWP hop (BWP2). In this example, the UE may determine that the first BWP hop is to be extended based at least in part on, for example, an extension rule indicating that a BWP hops are to be extended for HARQ-ACK transmissions. Thus, as indicated in FIG. 7, the UE determines that the first BWP hop is to be extended in association with transmitting the HARQ-ACK transmission. As indicated by the dashed box adjacent to the first BWP hop in FIG. 7, the UE extends the first BWP by a particular amount. The UE then transmits the HARQ-ACK transmission in the extended first BWP hop. As further shown, and as indicated by the dotted box associated with the second BWP hop, the UE modifies the second BWP hop by shifting the second BWP hop by the amount of time that the first BWP hop was extended.

As indicated above, FIGS. 6 and 7 are provided as examples. Other examples may differ from what is described with respect to FIGS. 6 and 7.

Figure 8:
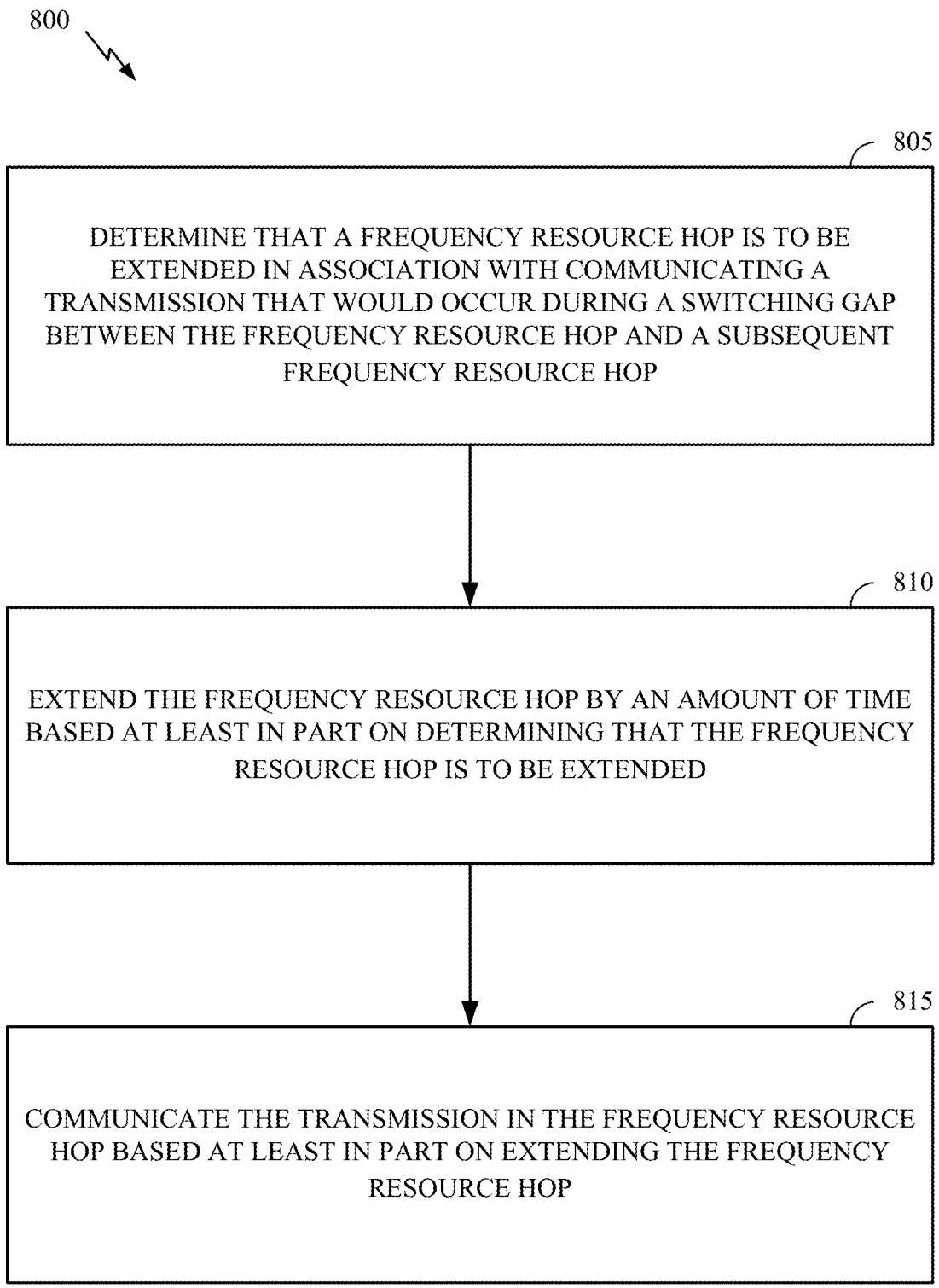
FIG. 8 is a diagram illustrating an example process performed, for example, by a wireless communication device, in accordance with various aspects of the present disclosure.

FIG. 8 is a diagram illustrating an example process 800 performed, for example, by a wireless communication device, in accordance with various aspects of the present disclosure. Example process 800 is an example where the wireless communication device (e.g., UE 120, base station 110, and/or the like) performs operations associated with a frequency resource hop extension.

As shown in FIG. 8, in some aspects, process 800 may include determining that a frequency resource hop is to be extended in association with communicating a transmission that would occur during a switching gap between the frequency resource hop and a subsequent frequency resource hop (block 805). For example, the wireless communication device (e.g., using receive processor 258, transmit processor 264, controller/processor 280, memory 282, and/or the like when the wireless communication device is a UE 120; using receive processor 238, transmit processor 220, controller/processor 240, memory 242, and/or the like when the wireless communication device is a base station 110) may determine that a frequency resource hop is to be extended in association with communicating a transmission that would occur during a switching gap between the frequency resource hop and a subsequent frequency resource hop, as described above.

As further shown in FIG. 8, in some aspects, process 800 may include extending the frequency resource hop by an amount of time based at least in part on determining that the frequency resource hop is to be extended (block 810). For example, the wireless communication device (e.g., using receive processor 258, transmit processor 264, controller/processor 280, memory 282, and/or the like when the wireless communication device is a UE 120; using receive processor 238, transmit processor 220, controller/processor 240, memory 242, and/or the like when the wireless communication device is a base station 110) may extend the frequency resource hop by an amount of time based at least in part on determining that the frequency resource hop is to be extended, as described above.

As further shown in FIG. 8, in some aspects, process 800 may include communicating the transmission in the frequency resource hop based at least in part on extending the frequency resource hop (block 815). For example, the wireless communication device (e.g., using receive processor 258, transmit processor 264, controller/processor 280, memory 282, and/or the like when the wireless communication device is a UE 120; using receive processor 238, transmit processor 240, memory 242, and/or the like when the wireless co=unication device is a base station 110) may communicate the transmission in the frequency resource hop based at least in part on extending the frequency resource hop, as described above.

Process 800 may include additional aspects, such as any single aspect or any combination of aspects described below and/or in connection with one or more other processes described elsewhere herein.

In a first aspect, the determining that the frequency resource hop is to be extended is based at least in part on a determination that a transmission type of the transmission is included in a set of transmission types for which frequency resource hops are to be extended.

In a second aspect, alone or in combination with the first aspect, information indicating the set of transmission types is signaled via at least one of radio resource control signaling, a medium access control control element, or downlink control information.

In a third aspect, alone or in combination with one or more of the first and second aspects, information indicating the set of transmission types is configured on the wireless communication device in accordance with a specification.

In a fourth aspect, alone or in combination with one or more of the first through third aspects, the set of transmission types includes at least one of a semi-persistent scheduling transmission, a configured grant transmission, a control resource set transmission, a dynamic physical downlink shared channel transmission, a dynamic physical uplink shared channel transmission, a hybrid automatic repeat request acknowledgment transmission, a channel state information transmission, a sounding reference signal transmission, a channel state information reference signal transmission, or a physical random access channel transmission.

In a fifth aspect, alone or in combination with one or more of the first through fourth aspects, process 400 includes modifying the subsequent frequency resource hop based at least in part on the amount of time that the frequency resource hop is extended.

In a sixth aspect, alone or in combination with one or more of the first through fifth aspects, the subsequent frequency resource hop is modified by shifting the subsequent frequency resource hop by the amount of time that the frequency resource hop is extended.

In a seventh aspect, alone or in combination with one or more of the first through sixth aspects, process 400 includes shifting one or more frequency resource hops after the subsequent frequency resource hop by the amount of time that the frequency resource hop is extended.

In an eighth aspect, alone or in combination with one or more of the first through seventh aspects, the subsequent frequency resource hop is modified by truncating a length of the subsequent frequency resource hop by the amount of time that the frequency resource hop is extended.

In a ninth aspect, alone or in combination with one or more of the first through eighth aspects, a manner in which the subsequent frequency resource hop is modified is signaled via at least one of radio resource control signaling, a medium access control control element, or downlink control information.

In a tenth aspect, alone or in combination with one or more of the first through ninth aspects, a manner in which the subsequent frequency resource hop is modified is configured on the wireless communication device in accordance with a specification.

In an eleventh aspect, alone or in combination with one or more of the first through tenth aspects, the determining that the frequency resource hop is to be extended is based at least in part on an indication signaled via at least one of radio resource control signaling, a medium access control element, or downlink control information.

In a twelfth aspect, alone or in combination with one or more of the first through eleventh aspects, the determining that the frequency resource hop is to be extended is based at least in part on one or more extension rules associated with determining whether to extend frequency resource hops.

In a thirteenth aspect, alone or in combination with one or more of the first through twelfth aspects, the one or more extension rules are signaled or enabled via at least one of radio resource control signaling, a medium access control element, or downlink control information.

In a fourteenth aspect, alone or in combination with one or more of the first through thirteenth aspects, the one or more extension rules are configured on the wireless communication device in accordance with a specification.

In a fifteenth aspect, alone or in combination with one or more of the first through fourteenth aspects, information indicating the amount of time by which the frequency resource hop is to be extended is signaled via at least one of radio resource control signaling, a medium access control element, or downlink control information.

In a sixteenth aspect, alone or in combination with one or more of the first through fifteenth aspects, information indicating the amount of time that the frequency resource hop is to be extended is determined based at least in part on one or more timing rules associated with determining amounts of time to extend frequency resource hops.

In a seventeenth aspect, alone or in combination with one or more of the first through sixteenth aspects, the one or more timing rules are signaled via at least one of radio resource control signaling, a medium access control element, or downlink control information.

In an eighteenth aspect, alone or in combination with one or more of the first through seventeenth aspects, the one or more timing rules are configured on the wireless communication device in accordance with a specification.

In a nineteenth aspect, alone or in combination with one or more of the first through eighteenth aspects, process 400 includes skipping the subsequent frequency resource hop based at least in part on a determination that the frequency resource hop, when extended by the amount of time, overlaps the subsequent frequency resource hop in time by an amount that satisfies a threshold, and further extending the frequency resource hop to cover the subsequent frequency resource hop based at least in part on skipping the subsequent frequency resource hop.

In a twentieth aspect, alone or in combination with one or more of the first through nineteenth aspects, information indicating the threshold is signaled via at least one of radio resource control signaling, a medium access control element, or downlink control information.

In a twenty-first aspect, alone or in combination with one or more of the first through twentieth aspects, information indicating the threshold is configured on the wireless communication device in accordance with a specification.

In a twenty-second aspect, alone or in combination with one or more of the first through twenty-first aspects, process 800 includes receiving an indication to enable or disable the skipping the subsequent frequency resource hop and the further extending of the frequency resource hop.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Example Techniques for Frequency Hopping

Certain aspects of the present disclosure are generally directed to techniques for frequency hopping. In certain aspects, a preconfigured frequency hopping configuration may be modified based on one or more conditions. For example, one or more frequency hops of a preconfigured frequency hopping pattern may be skipped or modified based on implicit conditions or measurements, as described in more detail herein. The frequency hopping may involve frequency hopping between subbands (SBs) of a system bandwidth (also referred to as SB frequency hopping), frequency hopping between bandwidth parts (BWPs), or frequency hopping between bands within a BWP.

A BWP generally refers to a contiguous set of physical resource blocks (PRBs) on a given carrier. Each BWP may be defined for a numerology and may have configured parameters such as subcarrier spacing, symbol duration, cyclic prefix (CP) length. For example, a UE may be configured with BWPs for downlink (DL) and uplink (UL). A BWP enables a UE to operate in narrow bandwidth. Generally, when a BWP is active for a UE, the UE may be expected to receive and transmit within the frequency range configured for the active BWP.

In some cases, frequency hopping may be implemented for a narrow BWP to mitigate potential performance loss due to a reduced bandwidth operation. BWP or SB frequency hopping may be beneficial to reduce narrowband (NB) interference effects, but may have certain side effects such as reduced utilization of a medium because of BWP or SB switch gaps (e.g., which may be in the order of ms). In other words, certain gaps in communication may be present when transitioning between frequency hops, in order for nodes to reconfigure radio frequency (RF) front-end (RFFE) circuitry for the new band. Moreover, a UE may consume more power because the UE has to retune RFFE circuitry, and moreover, due to additional digital baseband processing.

Certain aspects of the present disclosure are directed to techniques for frequency hopping that reduces BWP or SB hopping power consumption. For example, based on various conditions, one or more frequency hops may be modified or skipped, as described in more detail herein.

Figure 9:
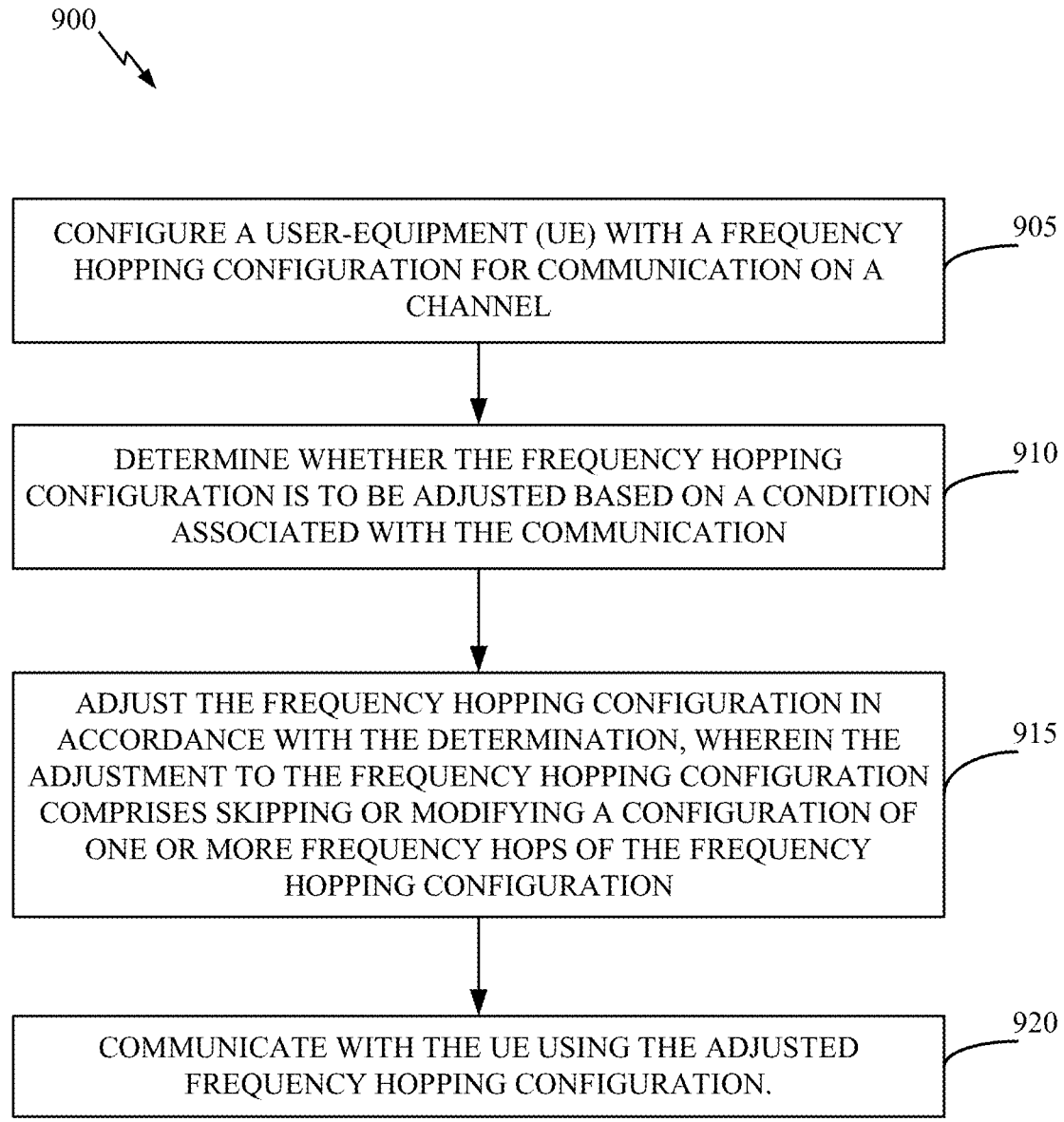
FIG. 9 is a flow diagram illustrating example operations for wireless communication by a BS, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as the BS 110*a* in the wireless communication network 100). The operations 900 may be complimentary operations by the BS to the operations 900 performed by the UE. Operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin, at block 905, with the base station configuring a UE with a frequency hopping configuration for communication on a channel. At block 910, the UE determines whether the frequency hopping configuration is to be adjusted based on a condition associated with the communication, and at block 915, adjusts the frequency hopping configuration based on the determination. In certain aspects, the adjustment to the frequency hopping configuration comprises skipping or modifying a configuration of one or more frequency hops (e.g., BWP or SB frequency hops) of the frequency hopping configuration. At block 920, the base station may communicate with the UE using the adjusted frequency hopping configuration.

Figure 10:
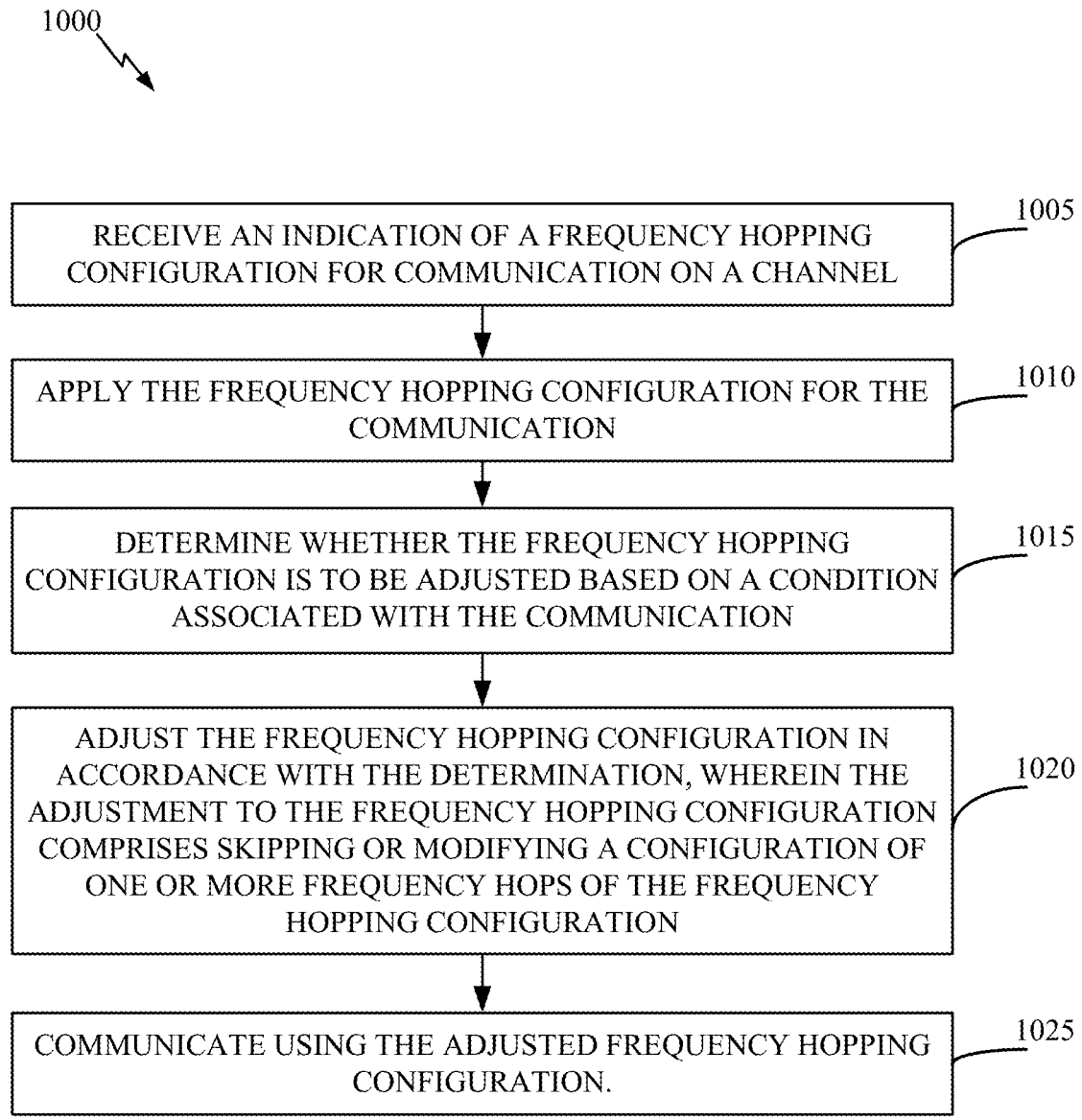
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by UE (e.g., such as a UE 120*a* in the wireless communication network 100). The operations 1000 may be complimentary operations by the UE to the operations 1000 performed by the BS. Operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at block 1005, by the UE receiving an indication of a frequency hopping configuration for communication on a channel, and at block 1010, applying the frequency hopping configuration for the communication. At block 1015, the UE determines whether the frequency hopping configuration is to be adjusted based on a condition associated with the communication, and at block 1020, adjusts the frequency hopping configuration based on the determination. The adjustment to the frequency hopping configuration may include skipping or modifying a configuration of one or more frequency hops of the frequency hopping configuration; and communicating using the adjusted frequency hopping configuration.

For example, a UE or BS may skip or modify one or more BWP or SB frequency hops based on certain conditions. The conditions may be signaled to the UE (e.g., using radio resource control (RRC), medium access control (MAC) control element (CE), downlink control signaling (DCI), or any combination thereof) or specified in a standard (e.g., configured at the UE). For example, a frequency hop may be skipped or modified if no control resource sets (CORESETs) are scheduled in the frequency hop, including regular and/or dynamic CORESETs. As another example, a frequency hop may be skipped or modified if no DL or UL dynamic grant is configured in the frequency hop. For example, semi-persistent scheduling (SPS) or a configured grant (CG) may be used to preconfigure data transmissions that may fall in one or more frequency hops. Frequency hops that are not scheduled with data transmissions may be candidates for skipping or modification. In some cases, a DCI in one frequency hop may be used to dynamically schedule a data transmission in another frequency hop. If a data transmission is not scheduled in a frequency hop, the frequency hop may be skipped or modified.

In certain aspects, a base station may manage the skipping or modification by a UE of one or more BWP/SB frequency hops. The base station may initiate the skipping or modification based on UE's explicit request. For example, the UE may use one or more internal metrics to determine whether frequency hop skipping or modifying is warranted, and send a request to the base station accordingly. The UE may transmit the request using physical uplink control channel (PUCCH), physical uplink shared channel (PUSCH) (e.g., MAC-CE), sounding reference signal (SRS), or some other means for UL communication. The base station may accept, change, or ignore the request from the UE. For example, the UE may measure high interference on an up-coming BWP/SB frequency hop, based on which the UE may request, from the base station, modification or skipping of frequency hop. The metric(s) to be used by the UE to determine whether to request modification or skipping of a frequency hop may be explicitly signaled to the UE, may be an internal UE metric, specified in a standard (e.g., configured at the UE), or any combination thereof.

In certain aspects, the base station may determine whether to skip or modify a frequency hop based on a report from the UE. For example, the UE may transmit measurement report(s). If the UE transmits a report indicating a low channel quality indicator (CQI) associated with a certain BWP/SB frequency hop, the base station may determine to skip or modify the BWP/SB frequency hop.

In certain aspects, the base station may determine whether to skip or modify a frequency based on the networks own metrics. For example, the base station may have knowledge that a certain frequency hop is congested, and determine to skip or modify the frequency hop accordingly.

In certain aspects, skipping or modifying one or more BWP/SB frequency hops may be explicitly indicated to the UE by the base station using signaling such as radio resource control (RRC), media access control (MAC)-control element (CE), downlink control information (DCI), or any combination thereof.

In certain aspects, the indication to skip or modify a frequency hop may be implicit. For example, the UE may determine to skip or modify a frequency hop based on certain signaled or specified rules. The UE may determine whether to skip or modify a frequency hop based on whether a data transmission or CORESET is scheduled in the frequency hop, as described herein. Implicit decisions to skip a BWP/SB frequency hop(s) may be configured and enabled/disabled by the base station using RRC, MAC-CE, and/or DCI signaling. For example, once enabled by the base station using signaling to the UE, the UE may begin considering metrics to determine whether one or more BWPs are to be skipped or modified. If a BWP/SB frequency hop(s) is skipped, the UE may reconfigure one or more other frequency hops, as described in more detail with respect to FIGS. 11A and 11B.

Figure 11A:
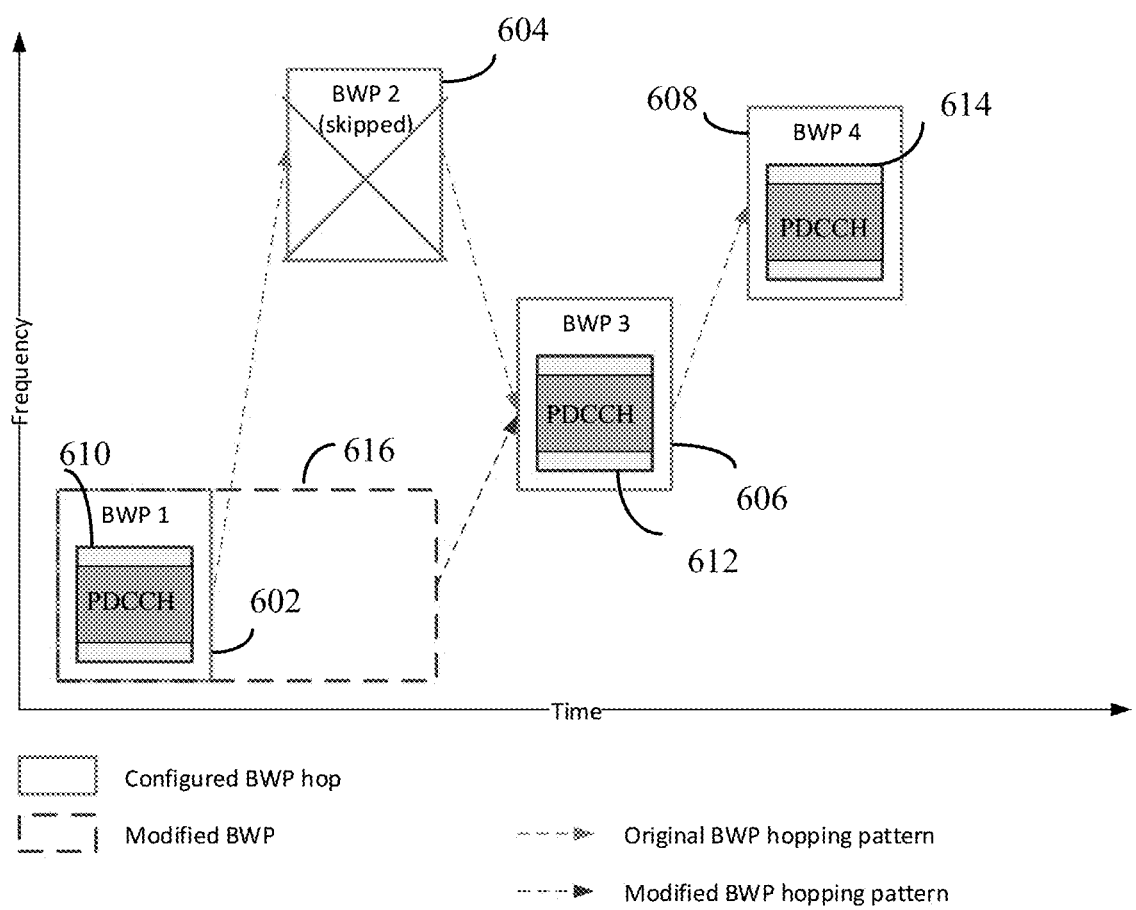
FIGS. 11A and 11B illustrates a skipped frequency hop, in accordance with certain aspects of the present disclosure.
Figure 11B:
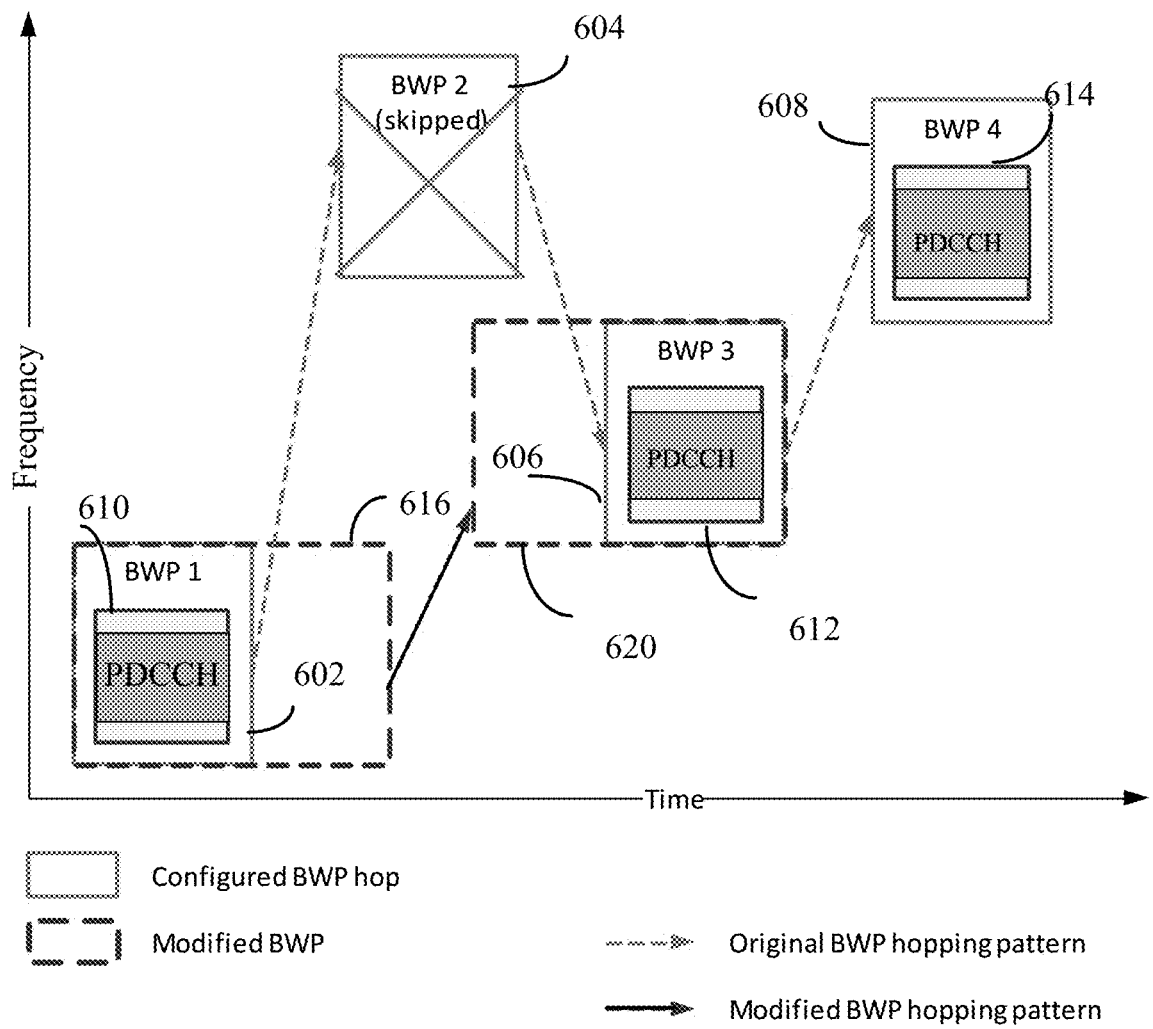

FIGS. 11A and 11B illustrates a skipped frequency hop, in accordance with certain aspects of the present disclosure. As illustrated, a BWP frequency hopping pattern may be configured, including BWP frequency hops 602, 604, 606, 608. The BWP frequency hops 602, 606, 608 may each have a CORESET 610, 612, 614 scheduled therein, which the exception of frequency hop 604. As illustrated, the BWP frequency hop 604 may be skipped. In this case, a previous BWP/SB frequency hop may be modified to utilize the medium that would have been occupied by BWP frequency hop 604. For example, the BWP frequency hop 602 may be extended in time to form the modified BWP frequency hop 616 that covers at least a portion of the period associated with the skipped frequency hop 604, as illustrated in FIG. 11A.

In certain aspects, a current BWP/SB frequency hop (e.g., frequency hop 602) may be extended in time and the next un-skipped BWP/SB frequency hop (e.g., frequency hop 606) may be started earlier. Thus, both the extension and earlier start of the frequency hops may cover at least a portion of the skipped BWP/SB frequency hop (e.g., frequency hop 604). For example, as illustrated in FIG. 11B, the frequency hop 606 may started earlier to form the modified BWP frequency hop 620.

In certain aspects, a base station may indicate to the UE whether to extend (or start early) one frequency hop (e.g., as described with respect to FIG. 11A), or extend and start early respective frequency hops (e.g., as described with respect to FIG. 11B). In certain aspects, whether to extend (or start early) one frequency hop (e.g., as described with respect to FIG. 11A), or extend and start early respective frequency hops (e.g., as described with respect to FIG. 11B) may be specified in a standard and configured at the UE. In certain aspects, instead of skipping a frequency hop, the frequency hop may modified, as described in more detail with respect to FIG. 12.

Figure 12:
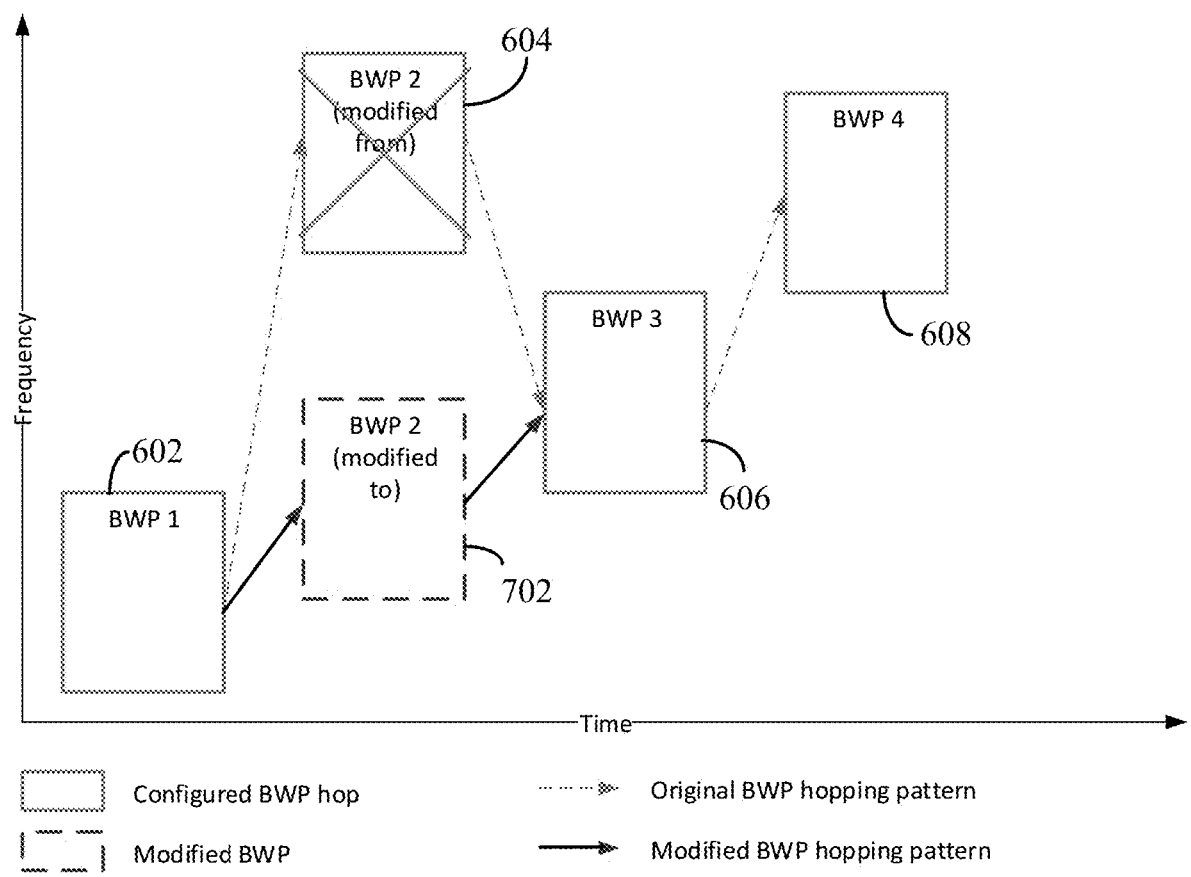
FIG. 12 illustrates a modification of a frequency hop, in accordance with certain aspects of the present disclosure.

FIG. 12 illustrates a modification of a frequency hop, in accordance with certain aspects of the present disclosure. The modification of the BWP/SB frequency hop may involve modifying one or more configuration parameters such as the frequency location, time duration, bandwidth (BW), reference signal (RS) signals, CORESET(s), or any combination thereof. For example, as illustrated, the frequency location of the frequency hop 604 may be modified to form the modified BWP frequency hop 702. In certain aspects, a configuration of RS (e.g., channel state information (CSI)-RS) in a frequency hop may be modified. For example, a number of beams covered by a CSI-RS configuration may be modified to, for example, cover 8 beams instead of 4 beams to improve communication in the frequency hop. As another example, a number of CORESETs scheduled in a frequency hop may be modified. For instance, a number of CORESETs in a frequency hop may be increased (or decreased) to allow for a greater (or fewer) number of UEs to be scheduled for communication in a frequency hop. As another example, the aggregation level of a CORESET may be modified. For instance, if channel quality is high for UEs communicating in a frequency hop, the CORESETs of the frequency hop may be modified to have a lower aggregation level.

In certain aspects, the skipping and modification procedures described herein may be separately or jointly configured/done for DL and UL BWPs. In other words, certain BWPs may be configured for UL and certain BWPs may be configured for DL. The skipping and/or modification of frequency hop(s) may be configured separately or jointly for a frequency hopping configuration associated with DL BWPs and a frequency hopping configuration associated with UL BWPs. While certain examples provided herein have been described with respect to BWP hopping (e.g., also referred to as BWP frequency hopping) to facilitate understanding, the aspects described herein may be applied to any frequency hopping configuration such as a SB hopping.

Figure 13:
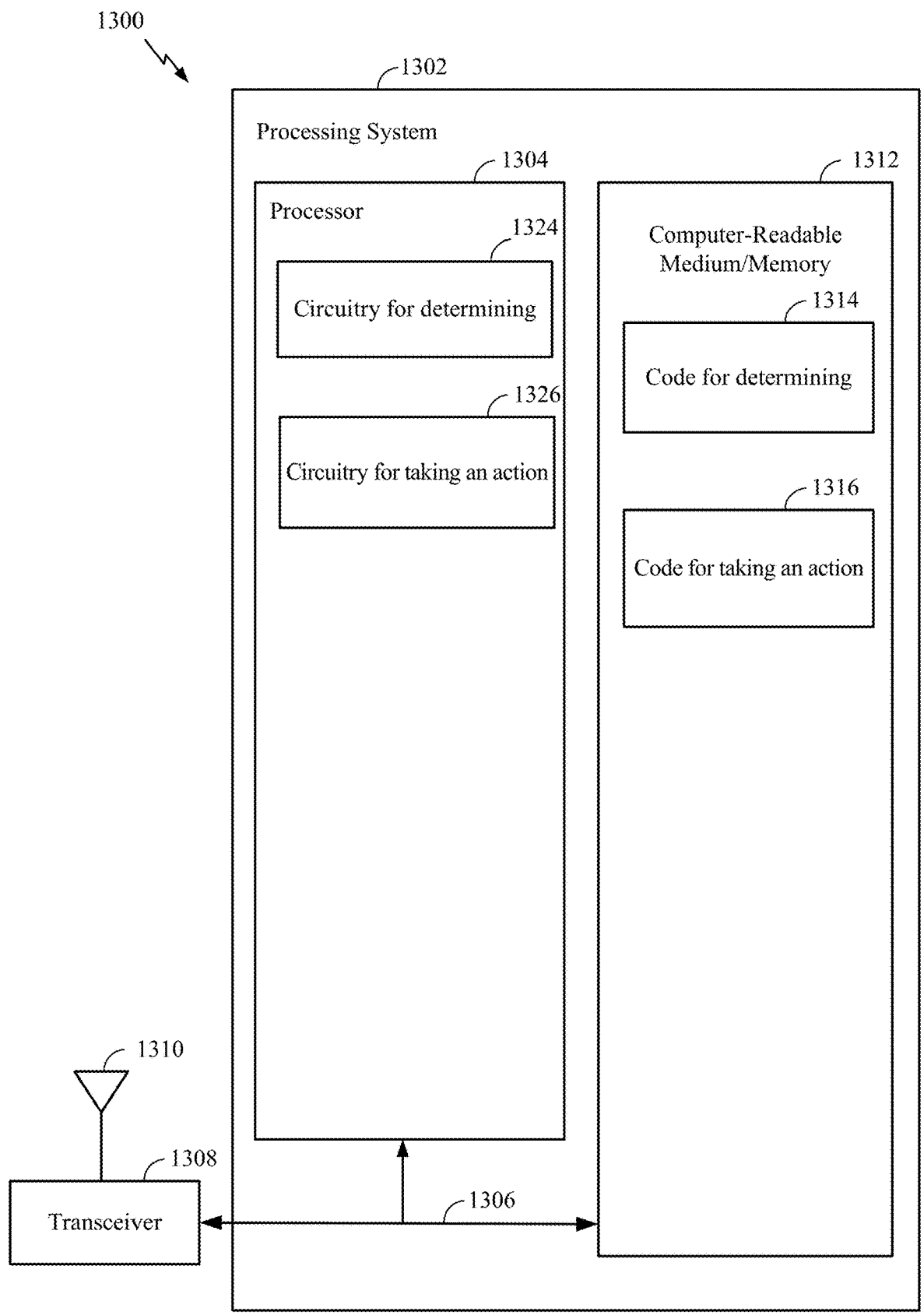
FIGS. 13-16 illustrates communications devices that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 4. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed (e.g., directly, or after compiling/interpreting/converting, etc.) by the processor 1304, cause the processor 804 to perform the operations illustrated in FIG. 4, and/or other operations for performing the various techniques discussed herein. In certain aspects, computer-readable medium/memory 1312 stores code 1314 for determining; and code 1316 for taking an action. In certain aspects, the processor 1304 has circuitry configured to implement the code stored in the computer-readable medium/memory 1312. The processor 1304 includes circuitry 1324 for determining; and circuitry 1326 for taking an action.

Figure 14:
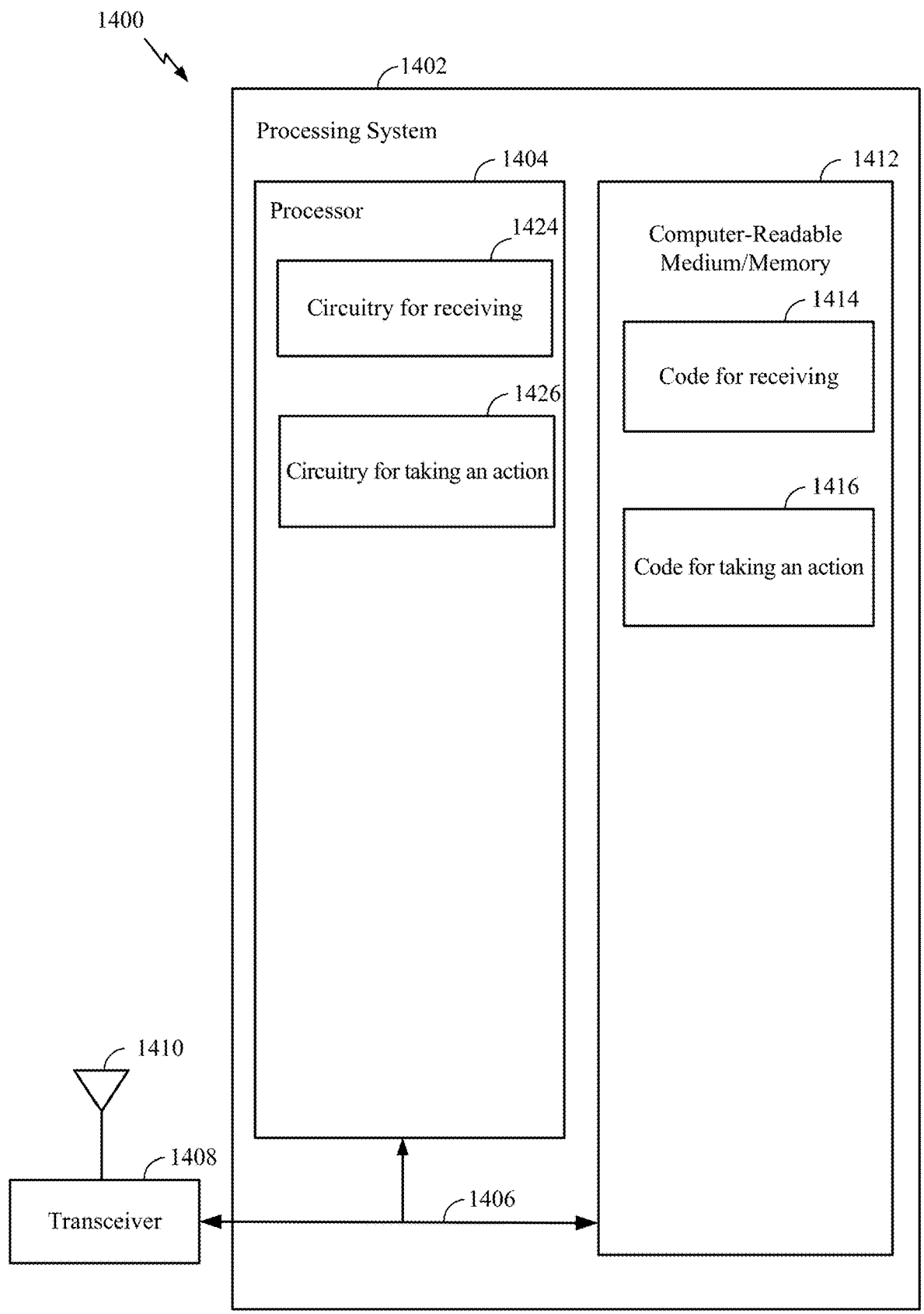

FIG. 14 illustrates a communications device 1400 that may include various components (e.g., corresponding to means-plus-function components) configured to perform operations for the techniques disclosed herein, such as the operations illustrated in FIG. 5. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed (e.g., directly, or after compiling/interpreting/converting, etc.) by the processor 1404, cause the processor 804 to perform the operations illustrated in FIG. 5, and/or other operations for performing the various techniques discussed herein. In certain aspects, computer-readable medium/memory 1412 stores code 1414 for receiving; and code 1416 for taking an action. In certain aspects, the processor 1404 has circuitry configured to implement the code stored in the computer-readable medium/memory 1412. The processor 1404 includes circuitry 1424 for receiving; and circuitry 1426 for taking an action.

Figure 15:
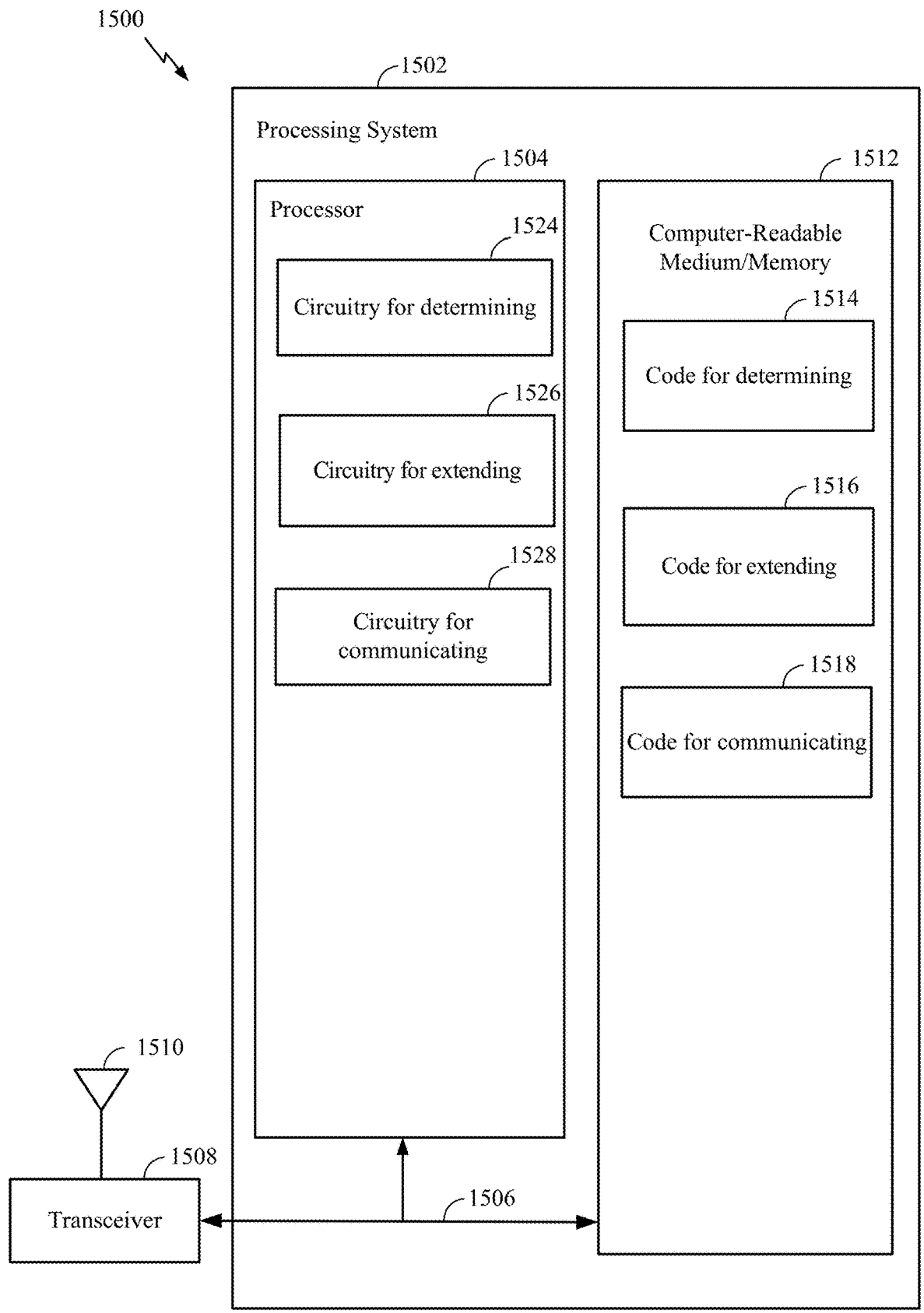

FIG. 15 illustrates a communications device 1500 that may include various components (e.g., corresponding to means-plus-function components) configured to perform operations for the techniques disclosed herein, such as the operations illustrated in FIG. 4. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed (e.g., directly, or after compiling/interpreting/converting, etc.) by the processor 1504, cause the processor 804 to perform the operations illustrated in FIG. 8, and/or other operations for performing the various techniques discussed herein. In certain aspects, computer-readable medium/memory 1512 stores code 1514 for determining; code 1516 for extending; and code 1518 for communicating (e.g., receiving and/or transmitting). In certain aspects, the processor 1504 has circuitry configured to implement the code stored in the computer-readable medium/memory 1512. The processor 1504 includes circuitry 1524 for determining; circuitry 1526 for extending; and circuitry 1528 for communicating.

Figure 16:
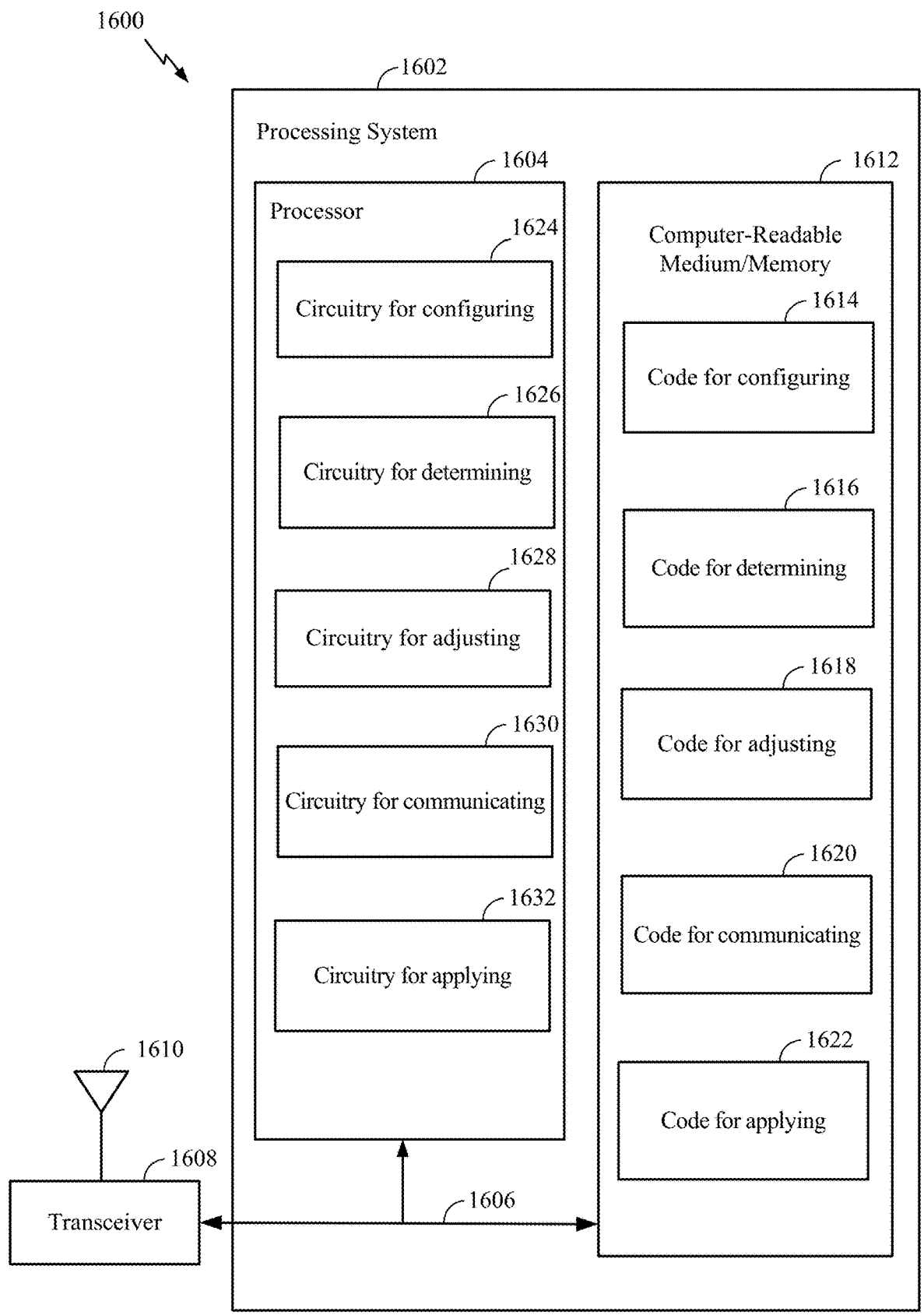

FIG. 16 illustrates a communications device 1600 that may include various components (e.g., corresponding to means-plus-function components) configured to perform operations for the techniques disclosed herein, such as the operations illustrated in FIG. 4. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed (e.g., directly, or after compiling/interpreting/converting, etc.) by the processor 1604, cause the processor 804 to perform the operations illustrated in FIG. 4, and/or other operations for performing the various techniques discussed herein. In certain aspects, computer-readable medium/memory 1612 stores code 1614 for configuring; code 1616 for determining; code 1618 for adjusting; code 1620 for communicating (e.g., receiving and/or transmitting); and code 1622 for applying. In certain aspects, the processor 1604 has circuitry configured to implement the code stored in the computer-readable medium/memory 1612. The processor 1604 includes circuitry 1624 for configuration; circuitry 1626 for determining; circuitry 1628 for adjusting; circuitry 1630 for communication; and circuitry 1632 for applying.

Example Clauses

Implementation examples are described in the following numbered clauses:

Clause 1: A method for wireless communication by a network entity, comprising: determining that an uplink or downlink transmission is scheduled for a user-equipment (UE) on resources that overlap with a time gap for switching from a first set of frequency resources to a second set of frequency resources; and in response to the determining, taking an action to reschedule the uplink or downlink transmission so that the uplink or downlink transmission does not overlap with the time gap.

Clause 2: The method of Clause 1, wherein the uplink or downlink transmission is an uplink transmission scheduled via downlink control information (DCI) signaling from a network entity.

Clause 3: The method of Clause 2, wherein taking the action to reschedule the uplink or downlink transmission comprises: indicating to the UE, via DCI signaling, a resource of the second set of frequency resources to use for the uplink transmission; or indicating to the UE, via signaling, a resource of the second set of frequency resources that is designated as a default resource for rescheduling uplink transmissions.

Clause 4: The method of any of Clause 2-3, wherein the uplink transmission scheduled via the first DCI signaling is an acknowledgment of physical downlink shared channel (PDSCH) signaling.

Clause 5: The method of any of Clause 1-4, wherein the uplink or downlink resource is an uplink resource scheduled via semi-persistent scheduling (SPS) or configured grant (CG) signaling from a network entity.

Clause 6: The method of Clause 5, wherein taking the action to reschedule the uplink or downlink transmission comprises indicating to the UE, via signaling, a resource of the second set of frequency resources that is designated as a default resource for rescheduling uplink transmissions.

Clause 7: The method of any of Clause 5-6, wherein the uplink transmission scheduled via SPS or CG signaling is an acknowledgment of physical downlink shared channel (PDSCH) signaling.

Clause 8: The method of any of Clause 1-7, wherein taking the action to reschedule the uplink or downlink transmission comprises: indicating to the UE, via DCI signaling, a physical uplink control channel (PUCCH) resource of the second set of frequency resources to use for the uplink or downlink transmission; indicating to the UE, via signaling, an increased delay period related to the uplink or downlink transmission; or indicating to the UE, via DCI or radio resource control (RRC) signaling, a resource of the second set of frequency resources to use for the uplink or downlink transmission.

Clause 9: The method of any of Clause 1-8, wherein the first set of frequency resources and the second set of frequency resources comprise sub-bands or bandwidth parts (BWPs).

Clause 10: A method for wireless communication by a user-equipment (UE), comprising: receiving, from a network entity, signaling that schedules an uplink or downlink transmission on resources that overlap with a time gap for switching from a first set of frequency resources to a second set of frequency resources; and taking an action to process the uplink or downlink transmission so that the uplink or downlink transmission does not overlap with the time gap.

Clause 11: A method of wireless communication performed by a wireless communication device, comprising: determining that a frequency resource hop is to be extended in association with communicating a transmission that would occur during a switching gap between the frequency resource hop and a subsequent frequency resource hop; extending the frequency resource hop by an amount of time based at least in part on determining that the frequency resource hop is to be extended; and communicating the transmission in the frequency resource hop based at least in part on extending the frequency resource hop.

Clause 12: The method of Clause 11, wherein the determining that the frequency resource hop is to be extended is based at least in part on a determination that a transmission type of the transmission is included in a set of transmission types for which frequency resource hops are to be extended.

Clause 13: The method of Clause 12, wherein information indicating the set of transmission types is signaled via at least one of: radio resource control (RRC) signaling; a medium access control control element; or downlink control information.

Clause 14: The method of any of Clause 12-13, wherein information indicating the set of transmission types is configured on the wireless communication device in accordance with a specification.

Clause 15: The method of any of Clause 12-14, wherein the set of transmission types includes at least one of: a semi-persistent scheduling transmission, a configured grant transmission; a control resource set transmission; a dynamic physical downlink shared channel transmission, a dynamic physical uplink shared channel transmission; a hybrid automatic repeat request acknowledgment transmission, a channel state information transmission; a sounding reference signal transmission; or a channel state information reference signal transmission, or a physical random access channel transmission.

Clause 16: The method of any of Clause 11-15, further comprising: modifying the subsequent frequency resource hop based at least in part on the amount of time that the frequency resource hop is extended.

Clause 17: The method of Clause 16, wherein the subsequent frequency resource hop is modified by shifting the subsequent frequency resource hop by the amount of time that the frequency resource hop is extended.

Clause 18: The method of Clause 17, further comprising: shifting one or more frequency resource hops after the subsequent frequency resource hop by the amount of time that the frequency resource hop is extended.

Clause 19: The method of any of Clause 16-18, wherein the subsequent frequency resource hop is modified by truncating a length of the subsequent frequency resource hop by the amount of time that the frequency resource hop is extended.

Clause 20: The method of any of Clause 11-19, further comprising: skipping the subsequent frequency resource hop based at least in part on a determination that the frequency resource hop, when extended by the amount of time, overlaps the subsequent frequency resource hop in time by an amount that satisfies a threshold; and further extending the frequency resource hop to cover the subsequent frequency resource hop based at least in part on skipping the subsequent frequency resource hop.

Clause 21: A method for wireless communication, comprising: configuring a user-equipment (UE) with a frequency hopping configuration for communication on a channel; determining whether the frequency hopping configuration is to be adjusted based on a condition associated with the communication; adjusting the frequency hopping configuration based on the determination, wherein the adjustment to the frequency hopping configuration comprises skipping or modifying a configuration of one or more frequency hops of the frequency hopping configuration; and communicating with the UE using the adjusted frequency hopping configuration.

Clause 22: The method of Clause 21, wherein the determination of whether the frequency hopping configuration is to be adjusted comprises: determining whether the one or more frequency hops are to be modified or skipped based on whether a control resource set is scheduled on the one or more frequency hops; determining whether the one or more frequency hops are to be modified or skipped based on whether a data transmission is scheduled on the one or more frequency hops; determining whether the frequency hopping configuration is to be adjusted based on a channel quality metric associated with the one or more frequency hops; or determining whether the frequency hopping configuration is to be adjusted based on one or more metrics configured by a network.

Clause 23: The method of Clause 22, further comprising: transmitting an indication of the channel quality metric to be measured by the UE; and receiving, from the UE, results of measurements associated with the channel quality metric.

Clause 24: The method of any of Clause 21-23, further comprising receiving a request to adjust the frequency hopping configuration, wherein the determination of whether the frequency hopping configuration is to be adjusted is based on the request.

Clause 25: The method of Clause 24, further comprising transmitting a response indicating whether the request has been accepted.

Clause 26: The method of any of Clause 21-25, further comprising receiving one or more channel quality measurements performed on the one or more frequency hops, the determination being based on the one or more channel quality measurements.

Clause 27: The method of any of Clause 21-26, further comprising: transmitting, to the UE, an indication of the adjustment to the frequency hopping configuration; or transmitting, to the UE, an indication to enable implicit adjustment of the frequency hopping configuration.

Clause 28: The method of any of Clause 21-27, wherein the adjustment to the frequency hopping configuration comprises skipping a first frequency hop of the one or more frequency hops, and wherein a duration of a second frequency hop that is configured to be before the first frequency hop is extended to cover at least a portion of a time period associated with the first frequency hop.

Clause 29: The method of Clause 28, wherein a third frequency hop that is configured to be after the first frequency hop is started early to cover at least another portion of the time period associated with the first frequency hop.

Clause 30: The method of Clause 29, wherein the adjustment to the frequency hopping configuration comprises modifying the configuration of the one or more frequency hops, the modification of the configuration of the one or more frequency hops comprising modifying at least one of a frequency location, a time duration, a bandwidth (BW), reference signal (RS), or control resource set (CORESET) configuration associated with the one or more frequency hops.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may include narrowband IoT (NB-IoT) devices. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. As used herein, including in the claims, "or" as used in a list of items (e.g., including: a list of items prefaced by a phrase such as "at least one of" or "one or more of") indicates an inclusive list that refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4, FIG. 5, and/or FIGS. 8-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a network entity, comprising:
determining that an uplink or downlink transmission is scheduled for a user-equipment (UE) on resources that overlap with a time gap for switching from a first set of frequency resources to a second set of frequency resources; and
in response to the determining, freezing one or more timers or counters during the time gap and taking an action to reschedule the uplink or downlink transmission so that the uplink or downlink transmission does not overlap with the time gap.

2. The method of claim 1, wherein the uplink or downlink transmission is an uplink transmission scheduled via downlink control information (DCI) signaling from a network entity.

3. The method of claim 2, wherein taking the action to reschedule the uplink or downlink transmission comprises:
indicating to the UE, via DCI signaling, a resource of the second set of frequency resources to use for the uplink transmission; or
indicating to the UE, via signaling, a resource of the second set of frequency resources that is designated as a default resource for rescheduling uplink transmissions.

4. The method of claim 2, wherein the uplink transmission scheduled via the first DCI signaling is an acknowledgment of physical downlink shared channel (PDSCH) signaling.

5. The method of claim 1, wherein the uplink or downlink resource is an uplink resource scheduled via semi-persistent scheduling (SPS) or configured grant (CG) signaling from a network entity.

6. The method of claim 5, wherein taking the action to reschedule the uplink or downlink transmission comprises indicating to the UE, via signaling, a resource of the second set of frequency resources that is designated as a default resource for rescheduling uplink transmissions.

7. The method of claim 5, wherein the uplink transmission scheduled via SPS or CG signaling is an acknowledgment of physical downlink shared channel (PDSCH) signaling.

8. The method of claim 1, wherein taking the action to reschedule the uplink or downlink transmission comprises:
indicating to the UE, via DCI signaling, a physical uplink control channel (PUCCH) resource of the second set of frequency resources to use for the uplink or downlink transmission;
indicating to the UE, via signaling, an increased delay period related to the uplink or downlink transmission; or
indicating to the UE, via DCI or radio resource control (RRC) signaling, a resource of the second set of frequency resources to use for the uplink or downlink transmission.

9. The method of claim 1, wherein the first set of frequency resources and the second set of frequency resources comprise sub-bands or bandwidth parts (BWPs).

10. A method for wireless communication by a user-equipment (UE), comprising:
receiving, from a network entity, signaling that schedules an uplink or downlink transmission on resources that overlap with a time gap for switching from a first set of frequency resources to a second set of frequency resources; and
taking an action to process the uplink or downlink transmission so that the uplink or downlink transmission does not overlap with the time gap, wherein one or more timers or counters are frozen during the time gap based on the uplink or downlink transmission being scheduled for the UE on the resources that overlap with the time gap for switching from the first set of frequency resources to the second set of frequency resources.

* * * * *